US012425263B2

(12) United States Patent
Homsi

(10) Patent No.: US 12,425,263 B2
(45) Date of Patent: Sep. 23, 2025

(54) POSITION-BASED AUTONOMOUS INDOOR ENVIRONMENT CONTROLLER

(71) Applicant: Rivieh Inc., Los Angeles, CA (US)

(72) Inventor: Mustafa Homsi, Los Angeles, CA (US)

(73) Assignee: Rivieh Inc., Los Angeles, CA (US)

( * ) Notice: Subject to any disclaimer, the term of this patent is extended or adjusted under 35 U.S.C. 154(b) by 863 days.

(21) Appl. No.: 16/517,123

(22) Filed: Jul. 19, 2019

(65) Prior Publication Data

US 2020/0028703 A1 Jan. 23, 2020

Related U.S. Application Data

(60) Provisional application No. 62/700,674, filed on Jul. 19, 2018.

(51) Int. Cl.
G05B 15/02 (2006.01)
G06N 20/00 (2019.01)
H04L 12/28 (2006.01)

(52) U.S. Cl.
CPC ............ H04L 12/282 (2013.01); G05B 15/02 (2013.01); G06N 20/00 (2019.01); H04L 12/2829 (2013.01); G05B 2219/25011 (2013.01)

(58) Field of Classification Search
CPC . H04L 12/282; H04L 12/2829; H04L 12/413; G05B 15/02; G05B 2219/25011; G06N 20/00; G06N 3/08
See application file for complete search history.

(56) References Cited

U.S. PATENT DOCUMENTS

| | | | | |
|---|---|---|---|---|
| 7,814,041 | B2* | 10/2010 | Caporale | G06N 20/00 706/51 |
| 8,068,051 | B1* | 11/2011 | Osterweil | G01S 13/886 340/573.5 |
| 11,024,105 | B1* | 6/2021 | Brand | G06K 7/10366 |
| 2012/0194083 | A1* | 8/2012 | Henig | H05B 47/18 315/152 |
| 2013/0320861 | A1* | 12/2013 | Sinai | H05B 47/115 315/152 |
| 2014/0244834 | A1* | 8/2014 | Guedalia | H04W 4/08 709/224 |
| 2014/0266669 | A1* | 9/2014 | Fadell | G08B 19/00 340/501 |
| 2015/0260581 | A1* | 9/2015 | Fadell | G08B 17/00 307/117 |
| 2016/0180848 | A1* | 6/2016 | Mengibar | G10L 15/08 704/251 |
| 2017/0231066 | A1* | 8/2017 | Roberts | F21S 8/086 |
| 2017/0309142 | A1* | 10/2017 | Phillips | G08B 13/1672 |

(Continued)

Primary Examiner — Robert E Fennema
Assistant Examiner — Marzia T Monty
(74) Attorney, Agent, or Firm — David R. Stevens; Stevens Law Group

(57) ABSTRACT

Intelligent environment control systems and methods are described. One embodiment includes a processing system. A sensing system is communicatively coupled to the processing system. One or more devices coupled to the processing system are configured to modify an environment associated with a user. The processing system is configured to control the devices. The processing system is configured to receive a sensor input from the sensing system. The processing system is configured to process the sensor input and determine a user interaction with the environment.

24 Claims, 25 Drawing Sheets

(56) References Cited

U.S. PATENT DOCUMENTS

| | | | |
|---|---|---|---|
| 2018/0158315 A1* | 6/2018 | Sloo | G08B 25/008 |
| 2019/0158309 A1* | 5/2019 | Park | G06F 16/9024 |
| 2019/0215177 A1* | 7/2019 | Donlan | H04L 12/2803 |
| 2021/0209348 A1* | 7/2021 | Tusch | G06V 20/52 |

* cited by examiner

POSITION-BASED AUTONOMOUS INDOOR ENVIRONMENT CONTROLLER

RELATED APPLICATION

This application claims the priority benefit of U.S. Provisional Application Ser. No. 62/700,674, entitled "Autonomous Space Control," filed on Jul. 19, 2018, the disclosure of which is hereby incorporated by reference herein in its entirety.

TECHNICAL FIELD

The present disclosure relates to systems and methods that learn a user behavior, a user intent, a user habit, and a user preference and control one or more environmental conditions in response to the learning.

BACKGROUND

Automated environment control systems available today include wall-mounted controllers that require extensive programming by a user for a controller to adequately learn one or more preferences of the user. Currently available environment control systems feature limited functionality in the sense that a specific environment control system is configured to control a limited set of environment variables. For example, a contemporary environment control system may be limited to controlling only lighting in a specific localized area such as a single room in a family home. Installing multiple environment control systems to control different aspects of environment variables once across multiple areas again can turn out to be expensive and complicated for a user. There exists a need, therefore, for an environment control system that offers simplicity in operation with an ability to control multiple environmental variables, while being inexpensive to install and operate by an end user.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
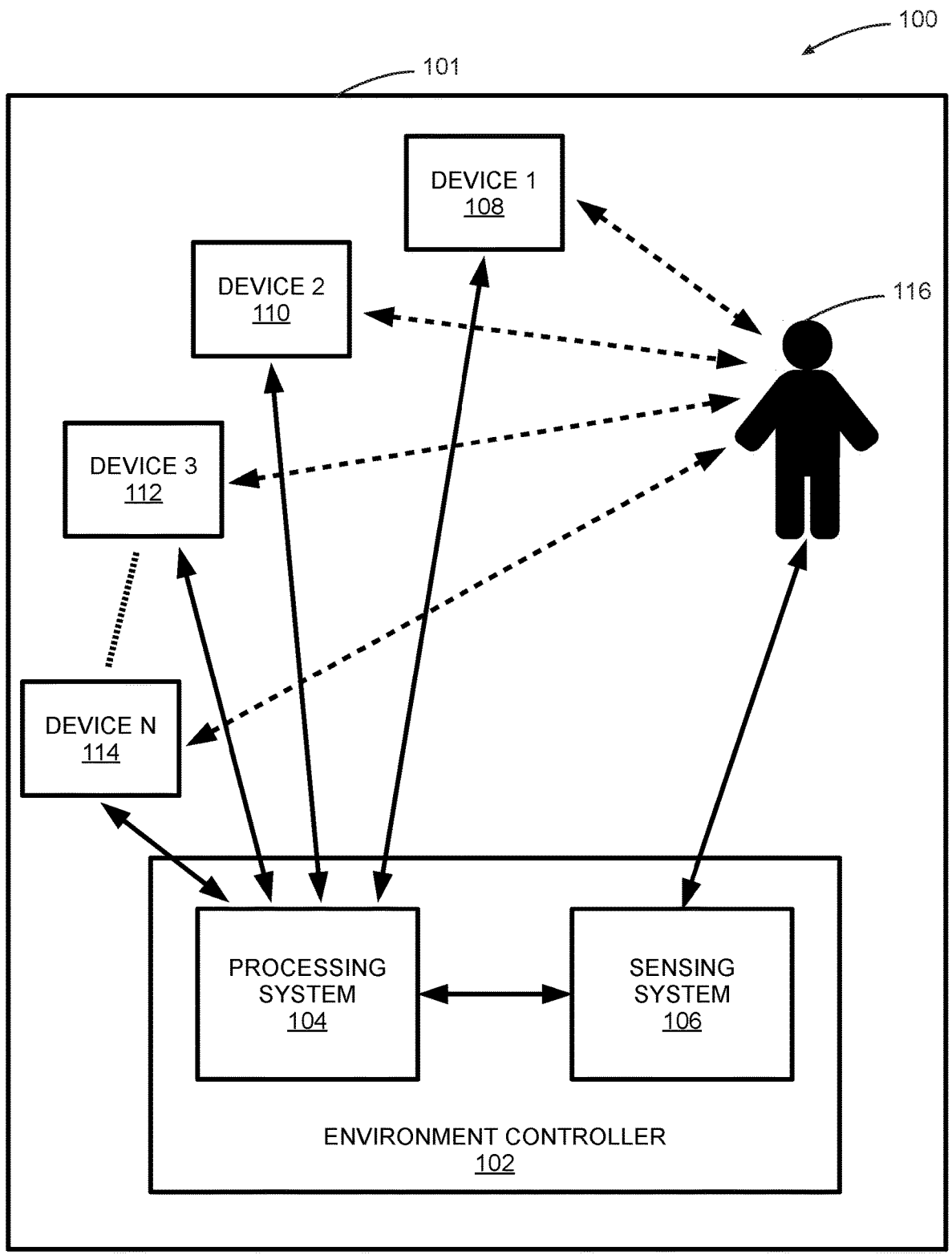
FIG. 1 is a block diagram depicting an embodiment of an environment control system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein are configured to modify an environment associated with a user. In some embodiments, the environment may include a room in a residence. In other embodiments, the environment may include an office space. The environment associated with the user may include parameters such as ambient lighting levels and ambient temperature levels in accordance with one or more preferences of the user. Some embodiments of the systems and methods described herein may be implemented using a combination of processing systems coupled to one or more sensors or sensing systems as described herein.

FIG. 1 is a block diagram depicting an embodiment of an environment control system 100. In some embodiments, environment control system 100 includes an environment controller 102 that includes a processing system 104 electrically coupled to a sensing system 106. In other embodiments, sensing system 106 is coupled to processing system 104 via one or more wired or wireless communication links. Sensing system 106 is configured to sense one or more parameters associated with a user 116 located in an environment 101. Environment 101 is defined as a region occupied by a user such as indoor room, an office suite, and so on. In some embodiments, the parameters associated with user 116 include a presence, a position, a location, an activity, one or more vital signs, an identity, one or more emotions, and so on. Sensing system 106 also includes sensors that sense parameters associated with environment 101, such as a temperature sensor, a humidity sensor, a microphone, a camera, and so on. Details about sensing system 106 are provided herein.

In some embodiments, environment control system includes a device 1 108, a device 2 110, a device 3 112, through a device N 114, where each of device 1 108 through device N 114 is electrically coupled to processing system 104. In particular embodiments, each of device 1 108 through device N 114 is coupled to processing system 104 via one or more wired or wireless communication links. In particular embodiments, user 116 can control each of device 1 108 through device N 114 via user inputs, as shown in FIG. 1. In response to user control inputs, each of device 1 108 through device N 114 is configured to control a parameter associated with environment 101 (also referred to herein as an "environmental parameter"). Examples of device 1 108 through device N 114 include heating, ventilation and air conditioning (HVAC) systems for temperature control of environment 101, lighting controllers for controlling ambient light levels and a color point associated with a light characteristic, window shade controllers for controlling an amount of external light entering environment 101 through a window as well as controlling a privacy level of the environment, fan controllers to control the air flow in the environment, music players, alarms, sirens, and so on. In other words, parameters associated with environment 101 include temperature levels, humidity levels, air flow, lighting color point and levels (both artificial lighting and natural lighting), sound levels, music levels, and so on.

In some embodiments, processing system 104 is configured to determine, responsive to receiving a sensor input from sensing system 106 and processing the sensor input, and responsive to environment controller 102 receiving user inputs to control environmental parameters via device 1 108 through device N 114, a user interaction with environment 101. In particular embodiments, the user interaction includes user 116 altering a one or more settings associated with device 1 108 through device N 114 via environment controller 102, to set, control, or alter one or more parameters associated with environment 101. For example, user 116 may set a particular HVAC temperature level to set an ambient temperature of their choice when going to sleep at night, the user may also set an ambient lighting level using the lighting controller when occupying the bedroom, play a choice of music, and so on. Data associated with such user interactions are received by processing system 104 via a combination of inputs from sensing system 106 (such as a user location, an ambient temperature level, and an ambient light level), and via processing system receiving data via user inputs. In some embodiments, user 116 enters these inputs via a user interface associated with processing system 104. Processing system 104 then routes these user inputs to the appropriate devices from device 1 108 through device N 114 as commands to control the environmental parameters. Responsive to processing data associated with the user interaction, processing system 104 is configured to determine a user intent associated with user 116 controlling devices 1 108 through device N 114. Examples of user intent include user preferences related to temperature and ambient lighting, as well as music preferences. These preferences may be dependent on a time of the day, a day of the week, a season, a condition of environment 101 and/or a location of environment 101.

Another example of user intent includes a consistently-observed user behavior pattern (or a user habit) when user 116 enters environment 101. For example, a user, on returning home from work, may enter a living room associated with a residence of the user, and set ambient temperature and ambient lighting levels using an HVAC controller and a lighting controller respectively. The user may then go to a bedroom associated with the residence, and configure a lighting controller for a preferred ambient lighting level in the bedroom. The user may then visit a bathroom adjoining the bedroom and turn on a light in the bathroom. The user may then turn off the bathroom light, turn off the bedroom light, make their way into a kitchen associated with the residence, and turn on a light in the kitchen. Such user intent and preferences may be routinely and consistently observed by processing system 104 in response to processing system 104 receiving data from a combination of sensing system 106, and user inputs.

In some embodiments, in response to determining a user intent via a learning process, processing system 104 is configured to autonomously determine a user intent using machine learning (ML) or artificial intelligence (AI) algorithms. In particular embodiments, determining a user intent includes learning one or more user preferences based on user inputs to environment controller 102, to control device 1 108 through device N 114. Determining a user intent may also include processing system 104 learning, responsive to receiving an input from sensing system 106, an interaction of user 116 with the environment via device 1 108 through device N 114, and a habit associated with user 116. Processing system 104 is then able to autonomously control device 1 108 through device N 114 to set one or more environmental parameters in accordance with learned user preferences. For example, processing system 104 detects, responsive to receiving an input from sensing system 106, that user 116 has entered environment 101. Processing system 104 then automatically controls device 1 108 through device N 114 to set (or control) the associated environmental parameters to be consistent with the preferences of user 116 for that specific location and moment.

In some embodiments, user 116 controls device 1 108 through device N 114 through one or more user inputs. In some embodiments, user 116 enters these user inputs via a user interface associated with processing system 104. Processing system 104 then routes these user inputs to the appropriate devices from device 1 108 through device N 114. In particular embodiments, processing system 104 is configured to receive these user inputs from device 1 108 through device N 114 and log the user inputs. This log may be used as a dataset for any artificial intelligence or machine learning component associated with processing system 104, as described herein. Similarly, inputs to processing system 104 from sensing system 106 are logged by processing system 104. These inputs are logged by processing system 104, and also processed by processing system 104 to characterize the environment associated with user 116.

In some embodiments, environment 101 may be a room in a residence. In other embodiments, environment 101 may be a room in an office space. In general, an environment can be defined as an indoor region. In some embodiments, environment 101 may be comprised of a collection of indoor regions that are separated by contiguous boundaries. For example, environment 101 may be comprised of multiple rooms in an apartment or a house, an entire house, or multiple rooms in an office suite. In such cases, from a general operating standpoint, environment control system 100 may include a plurality of environment controllers such as environment controller 102, where each room in environment 101 includes one or more environment controllers with associated sensing systems and devices. In other words, each room includes, for example, one or more environment controllers and associated devices for determining a user intent and accordingly controlling the environment. Each environment controller is configured to determine and learn about a user interaction, user intent, and a user habit, and subsequently autonomously control the associated environmental parameters.

In some embodiments, an environment controller is implemented using a lighting controller that includes a keypad, as described herein. This system may consist of one or many keypads distributed throughout the environment. Each keypad has a similar user interface to that of a manual power dimmer. This embodiment presents an interface of a standard light switch/dimmer, while also including components such as a power dimmer module, a sensor module, a communication module, and a logic module. The power dimmer module is responsible for adjusting the amount of electrical energy transferred to a connected load (i.e., a device such as device 1 108) such as a light or an HVAC device. (As presented herein, the term "load" may be used interchangeably with the term "device.")

To better understand the environment, occupants and activities, the sensor module employs various sensing technologies, as described herein. The communication module allows every keypad to wirelessly connect to all other keypads in a system, other mobile devices such as mobile phones, smart watches, and tablets, as well as the Internet if needed. In other embodiments, the communication module is utilized to connect with other remote sensor modules or remote power modules. The logic module includes a main digital controller which processes all information collected by other internal modules, other keypads in the system, other remote modules, other connected devices in the space (e.g., inputs from mobile phones) and the Internet (e.g., remote inputs). The controller then determines an appropriate action or series of actions to be taken by the system (all connected loads, connected devices and remote devices).

To allow self-programmability, environment controller 102 logs multiple parameters about the environment, occupants, other environment controllers, remote modules and its own internal hardware during every user interaction. These parameters may include light ambient, light color point, temperature, humidity, air flow, air quality, weather, occupancy state, a number of occupants, a time of the day, a calendar day, power usage, an artificial light level and other activated environment controllers. The system synchronizes these parameters across all components of the system and labels them with whatever desired loads settings based on user preferences. The system may save this labeled data in a local database, a remote database or both. After some time of manual operation collecting enough labeled data, the system may now reliably and fully automate the control of the space's settings without any user interaction. This is done by processing the database records through, for example, machine learning algorithms such as neural networks that can, with high confidence, predict the user's desired environment settings based on previous behaviors. For example, when the user enters the space (i.e. environment), one or more keypads detect the occupancy event which in turn, triggers the machine learning algorithm. This algorithm accesses current data from all keypads and compares it to previous behaviors. As a result, the system will adjust all necessary load(s) regardless of their location or how they are connected and adjust the space's settings to the user's liking. The machine learning algorithm can run locally (AI on an Edge device), in the cloud, or both and can be triggered by many other events. For example, while a user is in the bedroom and the lights are on, if the system determines that the occupants are sleeping and/or it is after midnight, the light may turn off accordingly.

Some embodiments of environment control system 100 are configured to be used as security control, fire alarm and health monitoring systems, as described herein. These embodiments avail of AI and machine learning features associated with environment control system 100 to implement these features.

Figure 2:
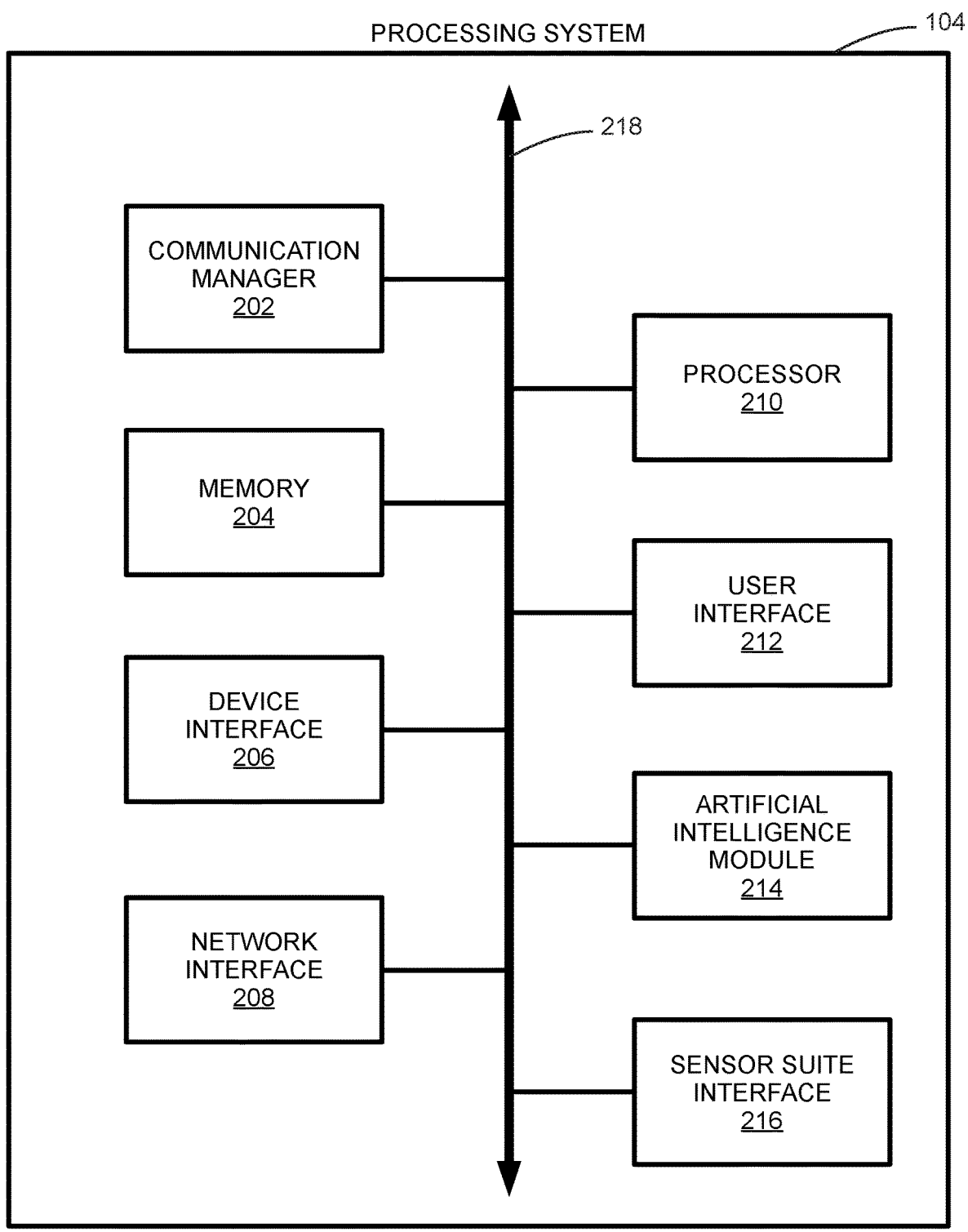
FIG. 2 depicts an embodiment of a processing system that may be used to implement certain functions of an environment control system.

FIG. 2 depicts an embodiment of processing system 104 that may be used to implement certain functions of environment control system 102. In some embodiments, processing system 104 includes a communication manager 202, where communication manager 202 manages communication protocols and associated communication with external peripheral devices as well as communication within other components in processing system 104. Communication manager 202 may be responsible for managing communication between the different components within processing system 104.

Some embodiments of processing system 104 include a memory 204 that may include both short-term memory and long-term memory. Memory 204 may be used to store, for example, data logs generated by processing system 104 as discussed previously. Memory 204 may be comprised of any combination of hard disk drives, flash memory, random access memory, read-only memory, solid state drives, and other memory components.

In some embodiments, processing system 104 includes a device interface 206 that is configured to interface processing system 104 with device 1 108 through device N 114. Device interface 206 generates the necessary hardware communication protocols and power associated with one or more interface protocols such as power on/off control, phase dimming, power line communication, a serial interface, a parallel interface, a wireless interface and so on.

A network interface 208 included in some embodiments of processing system 104 includes any combination of components that enable wired and wireless networking to be implemented. Network interface 208 may include an Ethernet interface, a WiFi interface, a cellular interface, a Bluetooth interface, a near-field communication interface (NFC), and so on.

Processing system 104 also includes a processor 210 configured to perform functions that may include generalized processing functions, arithmetic functions, and so on. Any artificial intelligence algorithms or machine learning algorithms (e.g., neural networks) associated with environment controller 102 may be implemented using processor 210.

In some embodiments, processing system 104 may also include a user interface 212, where user interface 212 may be configured to receive commands from a user, or display information to the user. User interface 212 enables a user to interact with environment controller 102 and control device 1 108 through device N 114. Commands received from a user include commands to control device 1 108 through device N 114, to set environmental parameters that are consistent with one or more preferences associated with the user. Examples of user interface 212 are presented herein.

Some embodiments of processing system 104 include an artificial intelligence module 214 that is configured to implement machine learning (ML) and artificial intelligence (AI) algorithms associated with environment controller 102. Details of artificial intelligence module 214 are provided herein.

In some embodiments, processing system 104 includes a sensor suite interface that is configured to implement the necessary communication protocols that allow processing system 104 to send and receive data to and from sensing system 106.

Figure 3:
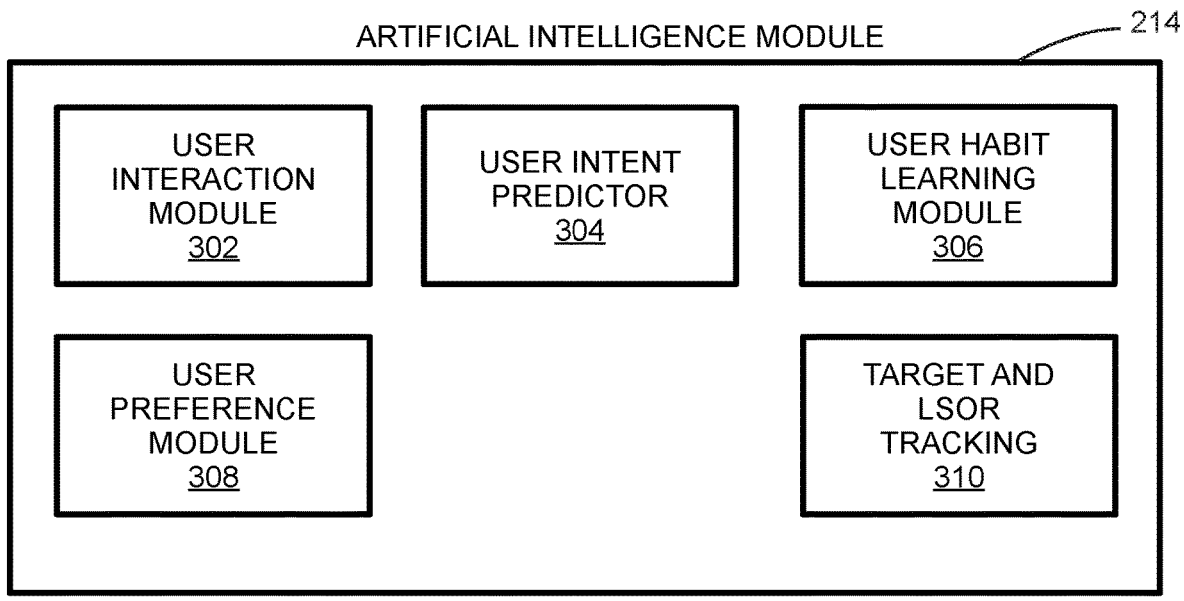
FIG. 3 is a block diagram depicting an embodiment of an artificial intelligence module.

FIG. 3 is a block diagram depicting an embodiment of an artificial intelligence module 214. Some embodiments of artificial intelligence module 214 may use components such as a neural network to implement at least some of the functionality of artificial intelligence module 214.

In some embodiments, artificial intelligence module 214 includes a user interaction module 302 that is configured to read and log data associated with an interaction of user 116 with the environment, where the user interaction includes user 116 controlling device 108 through device N 114 via environment controller 112, as well as user movements and occupancy patterns in the environment.

A user intent predictor 304 included in artificial intelligence module 214 is configured to use machine learning algorithms to predict a user intent such occupying a living room in the morning and performing a sequence of actions that include turning on a light in the living room, opening up one or more window shades, adjusting a temperature associated with the environment, playing music and so on. User intent predictor 304 enables artificial intelligence module 214 to perform predictive control over the environment based on a most probable guess related to an anticipated intent of user 116. For example, user intent predictor 304 might enable environment controller 112 to autonomously control device 1 108 through device N 114 and set environmental parameters consistent with user preferences associated with user 116.

In some embodiments, artificial intelligence module 214 includes a user habit learning module 306 that is configured to use artificial intelligence techniques and learn one or more habits associated with a user. For example, user habit learning module 306 may be configured to learn the sequence of habits of a user such as user 116 when the user occupies a living room in the morning as described above. Data learned by user habit learning module 306 may be used as an input to user intent predictor 304 to help user intent predictor 304 make more accurate determinations of a probable user intent.

Some embodiments of artificial intelligence module 214 include a user preference module 308 that is configured to learn and store one or more user preferences associated with a user of environment control system 100 such as user 116. As described above, user preferences include temperature and ambient lighting, as well as music preferences. User preferences stored by user preference module 308 are used by user intent predictor 304 to control device 1 108 through device N 114 so that appropriate environmental parameters are set and maintained in accordance with the user preferences.

A target and LSOR tracking 310 included in some embodiments of artificial intelligence module 214 is configured to track a location of a target and place the target in a load-specific occupancy region (LSOR). A target is defined as one of a user, a pet, an adult, and a child. In some embodiments, target and LSOR tracking 310 is configured to track multiple targets and multiple LSORs. Since most of the time a target of interest is a user of the system or an occupant of the environment, the term "occupant", the term "user", and the term "target", may all be used interchangeably as presented herein. An LSOR is defined as an occupancy region associated with a load in an environment. Essentially, an LSOR is a portion, or section, of the environment, that is usually occupied by the user when using a specific load in the environment. An LSOR can be sensed by (or is within a field of view of) environment controller 102. Target and LSOR tracking 310 is configured to characterize and track different aspects of the targets and LSORs, such as classifying any occupants in an LSOR, performing coordinate transformations, and so on. Details of target and LSOR tracking 310 are provided herein. Some embodiments of target and LSOR tracking 310 perform classification functions using a neural network, as described herein.

In some embodiments, a single environment controller may not be sufficient to fully sense a region associated with a load in an environment; the associated LSOR may cover a portion of the space associated with the environment. To fully characterize the space associated with the environment, multiple environment controllers may be used, where an LSOR associated with each controller covers separate regions of the environment. This aspect of operation is described herein.

Figure 4:
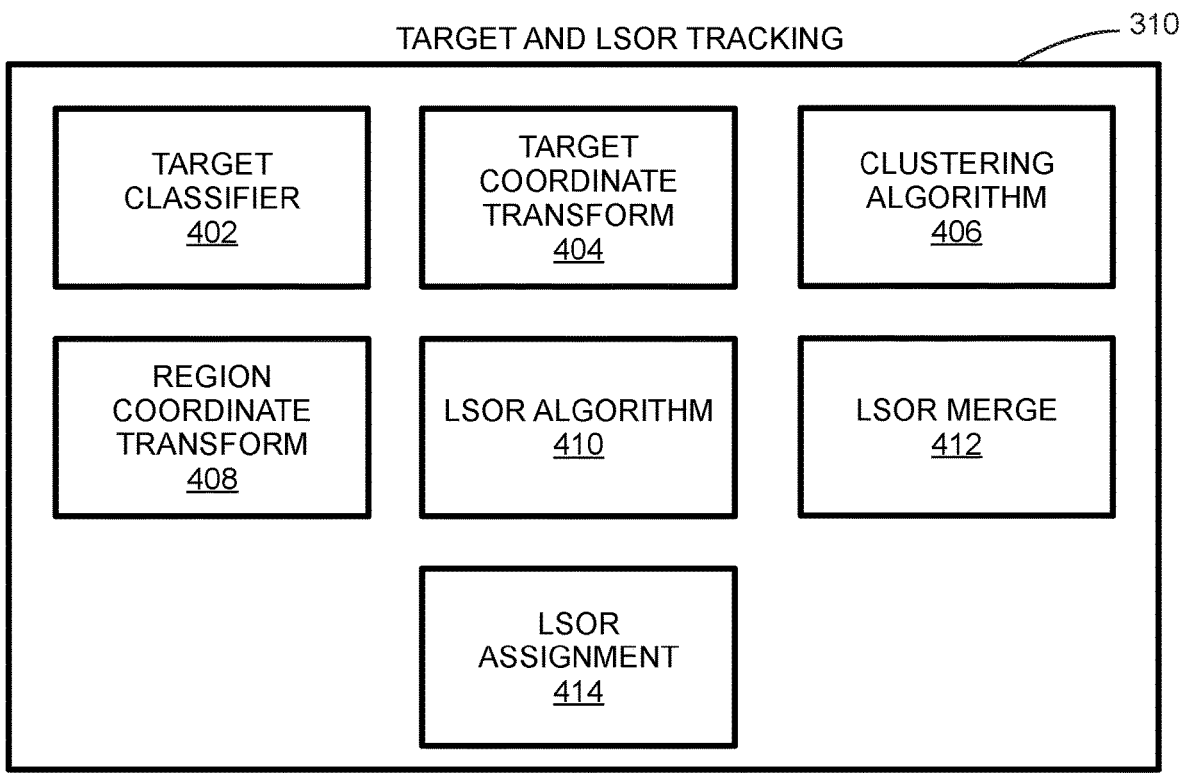
FIG. 4 is a block diagram depicting an embodiment of a target and load-specific occupancy region (LSOR) tracking.

FIG. 4 is a block diagram depicting an embodiment of target and LSOR tracking 310. In some embodiments, target and LSOR tracking 310 includes a target classifier 402 that is configured to read in raw positioning data of an environment with stationary and moving targets, where the raw positioning data is generated, for example, by a radar system. Target classifier 402 is configured to determine a position of a specific target of interest in a polar coordinate system referenced to environment controller 102. A target coordinate transform 304 included in target and LSOR tracking 310 is configured to transform the positions from a polar coordinate system to a Cartesian coordinate system to determine an x-position, a y-position, and a z-position associated with each user (also referred to as an "occupant" or a "target") in the environment.

A clustering algorithm 406 included in some embodiments of target and LSOR tracking 310 is configured to read in position data associated with one or more users (occupants, targets) in an environment, and output a polar boundary for a region or a map associated with an associated target occupancy pattern. A polar boundary encompasses a three-dimensional field of view of a sensing suite associated with an environment controller. The output of clustering algorithm 406 is processed by a region coordinate transform 408 that is configured to transform the polar boundary for each region or map to a corresponding boundary in a Cartesian coordinate system. In some embodiments, an LSOR algorithm 410, bounds one or more outputs generated by clustering algorithm 406 output map or region in a way it can be associated with a specific device or load. In some embodiments, an association logic is triggered by a user activating a specific load, and is terminated when the user deactivates the load, or after a predetermined period of time has expired. This load activation and deactivation trigger could be generated by monitoring user inputs associated with controlling the load, or environment controller 102 receiving a sensing input associated with a change in the environment as a result of the user activating or deactivating the load. In some embodiments, the polar boundary encompasses the three-dimensional field of view of the sensing suite associated with an environment controller. The output of clustering algorithm 406 is processed by a region coordinate transform 408 that is configured to transform the polar boundary for each LSOR to a corresponding boundary in a Cartesian coordinate system. An LSOR merge 412 merges any overlapping LSORs to create one or more composite LSORs, the boundaries of which are defined in the associated Cartesian coordinate system. An embodiment of target and LSOR tracking 310 may also include an LSOR assignment 414 that combines data associated with the composite LSORs and the x-position, a y-position, and a z-position associated with each user to generate a count of targets within each LSOR. In some embodiments, LSOR merge 412 is also configured to merge any overlapping regions associated with overlapping occupancy patterns.

Figure 5:
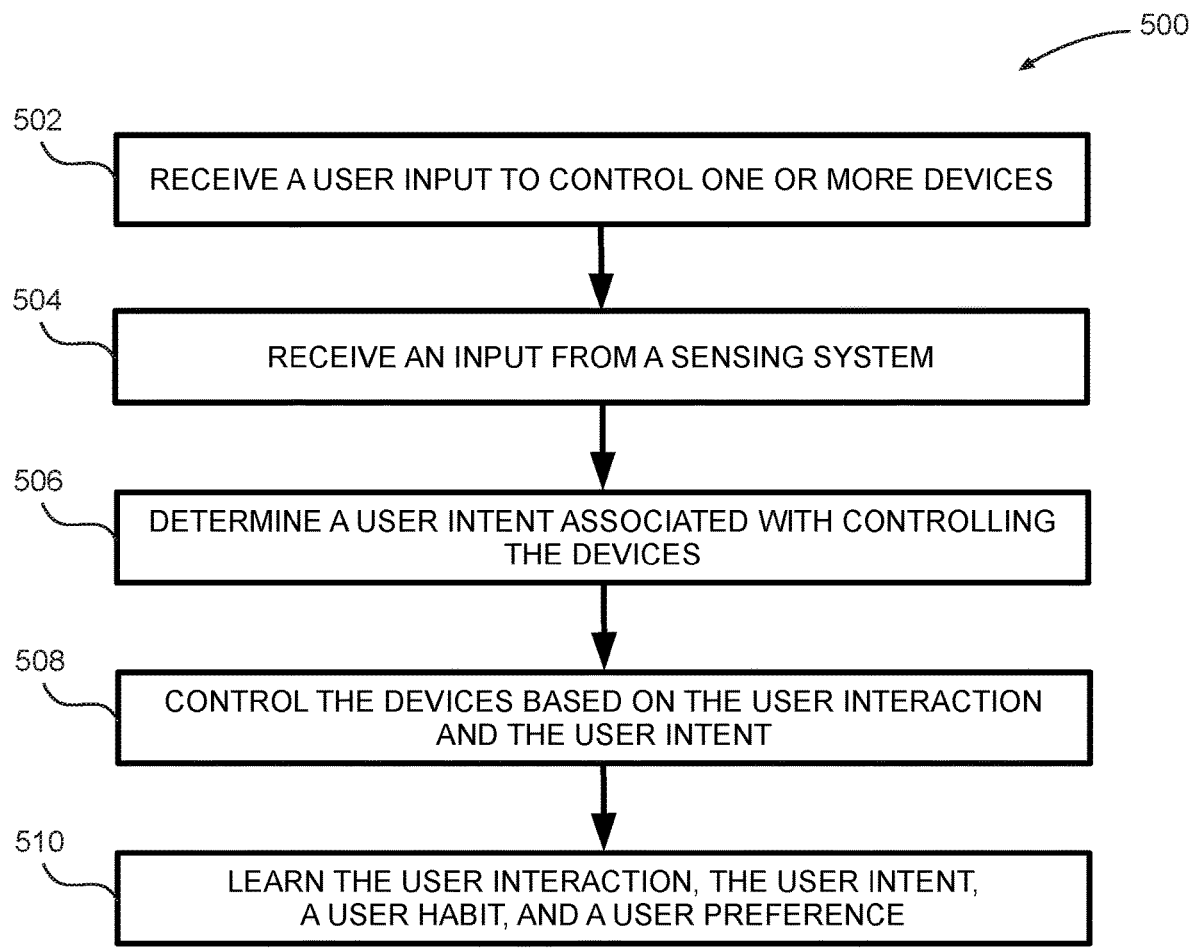
FIG. 5 is a flow diagram depicting an embodiment of a method to learn a user interaction, a user intent, a user habit, and a user preference.

FIG. 5 is a flow diagram depicting an embodiment of a method 500 to learn a user interaction, a user intent, a user habit, and a user preference. At 502, the method receives a user input to control one or more devices. In some embodiments, the user is user 116, the devices are device 1 108 through device N 114, and the user input is intended to control one or more environments parameters as described above. The user inputs are received and interpreted by processing system 102. At 504, the method receives an input from a sensing system such as sensing system 106. In some embodiments, the input may include inputs from multiple individual sensors such as a temperature sensor, an ambient light sensor, a radar sensor and other sensors as described herein. Next, at 506, the method 500 determines a user intent associated with controlling the devices using, for example, user intent predictor 304. At 508, the method controls the devices based on the user interaction and the user intent. In some embodiments, this step is accomplished by processing system 104. Finally, at 510, the method learns the user interaction, the user intent, a user habit, and a user preference associated with controlling the environmental parameters. In some embodiments, this task is performed by artificial intelligence module 214 using, for example, a combination of machine learning and neural networks.

Figure 6:
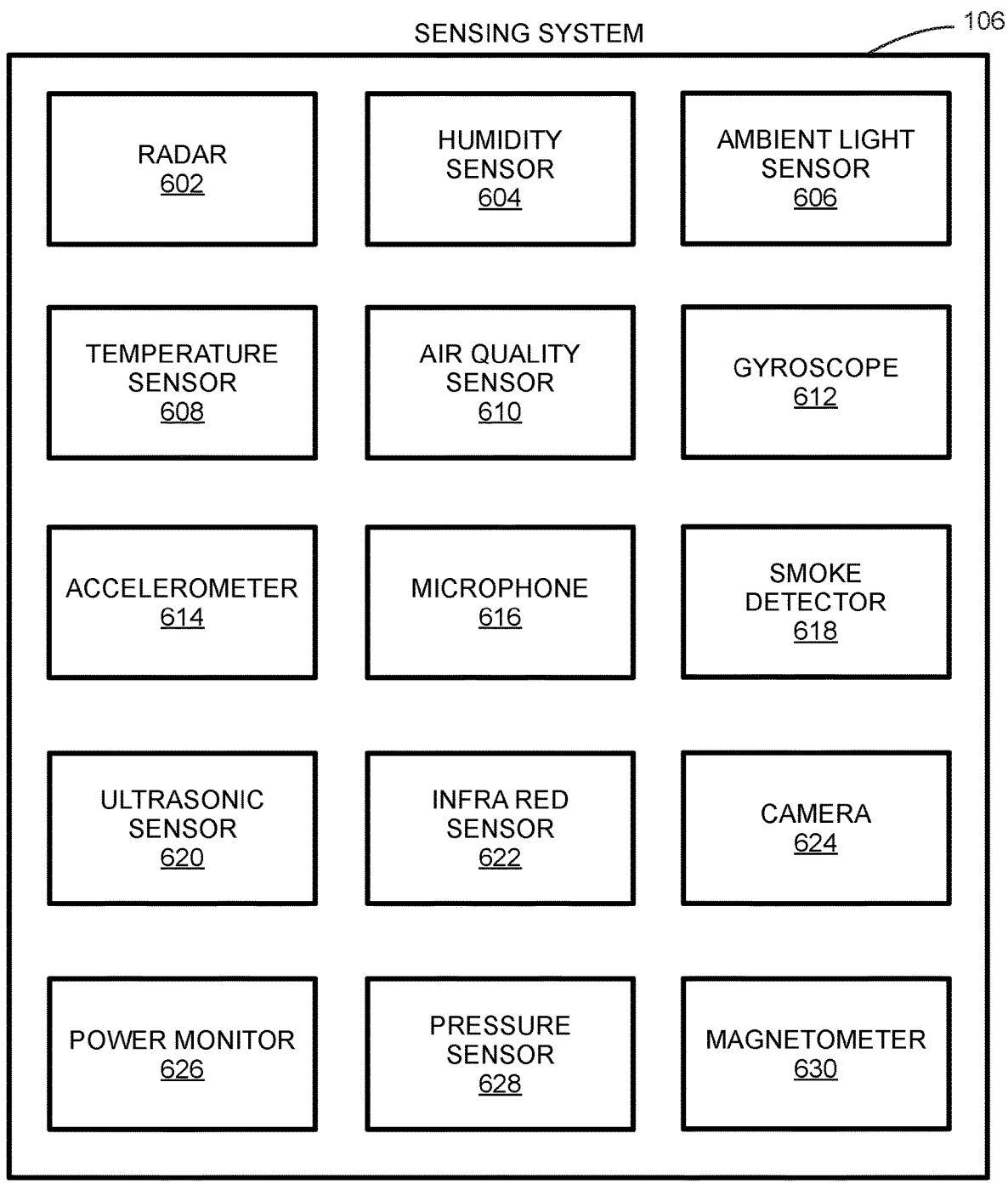
FIG. 6 is block diagram depicting an embodiment of a sensing system.

FIG. 6 is block diagram depicting an embodiment of sensing system 106. In some embodiments, sensing system 106 includes a radar 602 that is configured to generate data associated with a position of an occupant or a user (such as user 116) in the environment associated with environment controller 102. The data generated by radar 602 is processed by processing system 104 to determine a location of user 116 in a local coordinate system associated with environment controller 102. In embodiments where multiple environment controllers are deployed in an environment, an RF radar signal associated with a particular environment controller may be digitally modulated with a unique code that distinguishes that particular RF radar signal from RF radar signals.

Some embodiments of sensing system 106 include a humidity sensor 604 that is configured to generate data associated with determining the humidity of a particular environment. Based on a measured humidity level, environment controller 102 can control device 1 108 through device N 114 and/or an HVAC system in accordance with a user preference. Humidity sensor 604 is also useful when the environment is associated with a bathroom. In this case, the environment controller 102 characterizes the environment as a bathroom based on recording higher humidity conditions as compared to lower humidity conditions that would be present elsewhere in a residential home.

In some embodiments, sensing system 106 includes an ambient light sensor 606 that is configured to generate data associated with measuring ambient light levels. Based on a measured ambient light level, environment controller 102 can control device 1 108 through device N 114 in accordance with a user preference. For example, if a user enters a bedroom and the lights are off, environment controller detects a presence of the user using, for example, radar 602, and determines that the lights in the bedroom are turned off using ambient light sensor 606. Based on this information and learned user preferences, environment controller 102 can then turn on one or more lights and adjust the associated lighting levels in accordance with learned user preferences. Ambient light sensor 606 is also useful for maintaining a lighting condition of the environment (light level and color point) to a specific desired condition. For example, ambient light sensor 606 could detect a decrease in ambient light level and a change in the color point due to a sunset event in an environment with outside windows, and as result the processing system 104 adjusts device 1 108 through device N 114 to maintain a fixed desired lighting condition for the environment. In some embodiments, light levels can also be adjusted by environment controller 102 using powered window shades.

A temperature sensor 608 is included in some embodiments of sensing system 106. In some embodiments, temperature sensor 608 is configured to generate data associated with an ambient temperature of the environment. Processing system 104 is configured to determine the ambient temperature responsive to processing this data and, if necessary, control an HVAC system to change the ambient temperature in accordance with user preferences. In some embodiments, temperature sensor 608 can also be configured to generate data corresponding to abnormally high temperatures in the environment that could be associated with, for example, a fire. In such an event, processing system 104 is configured to process this data and generate an alarm if the ambient temperature rises above a certain threshold. The alarm generated by processing system 104 may be any combination of a local alarm and a distress signal to local authorities and rescue teams.

In some embodiments, sensing system 106 includes an air quality sensor 610 that is configured to generate air quality data associated with measuring ambient air quality of an environment. Air quality sensor may be configured to measure, for example, a level of carbon monoxide in the air, or the presence of allergens in the air. Responsive to processing the air quality data, processing system 104 can be configured to generate an alarm if the air quality drops below a certain threshold. The alarm generated by processing system 104 may be any combination of a local alarm and a distress signal to local authorities and rescue teams.

In some embodiments, sensing system 106 includes a gyroscope 612 and an accelerometer 614 that are configured to generate motion data. Motion data may include vibration data that may be generated by a user in the proximity of environment controller 102. In some embodiments, vibration data may be generated by natural phenomena such as earthquakes. If the magnitude of the vibration data as processed by processing system 104 exceeds a certain threshold, processing system 104 generates an alarm. The alarm generated by processing system 104 may be any combination of a local alarm and a distress signal to local authorities and rescue teams.

Some embodiments of sensing system 106 include a microphone 616 that is configured to receive audio signals from the environment and generate audio data. In some embodiments, microphone 616 is a micro electromechanical systems (MEMS) microphone. In some embodiments, audio data generated by microphone 616 is processed by processing system 104. A voice detection and recognition system associated with processing system can be used to detect a presence of a user in the environment. Also, recognizing and characterizing the voice of a user can be used to identify a particular user. Once a particular user is identified, environment controller 102 can then control device 1 108 through device N 114 to set the environmental parameters in accordance with previously learned preferences associated with the particular user. Microphone 616 can also be useful in detecting pet presence and their type after recognizing their sound. For example, a barking dog.

In particular embodiments, processing system 104 may be configured to generate one or more alarms responsive to processing audio data that may be characterized as a distress call. In the event that a user is in distress, a cry for help can be used to generate an alarm and a distress signal to alert local authorities and rescue teams.

Some embodiments of sensing system 106 include a smoke detector 618 that is configured to generate smoke data associated with detecting particles of smoke in the air. Such smoke data could indicate a presence of a fire in the environment. In this case, processing system 104 is configured to generate an alarm if smoke data processing indicates a presence of smoke in the environment. The processing system may also generate a distress signal to alert local authorities and rescue teams.

In some embodiments, sensing system 106 includes an ultrasonic sensor 620. Ultrasonic sensor 620 is configured to generate and sense one or more ultrasonic waveforms that are used for detecting and locating one or more users (occupants) in the environment in a manner similar to that used by radar 602.

Some embodiments of sensing system 106 include an infra red sensor 622 that is configured to generate infra red data associated with a presence of a user or an occupant in an environment. Infra red data generated by infra red sensor 622 is processed by processing system 104 to detect a presence of a user in the environment and their proximity to the environment controller 102. Infra red sensor 622 may also be used to detect an unauthorized occupant in the environment, responsive to which processing system 104 may be configured to generate an alarm.

In some embodiments, sensing system 106 includes a camera 624 that is configured to generate visual data associated with one or more users in the environment. This visual data may be processed by processing system 104 to perform, for example, face identification and other user detection using machine learning methods. Subsequently, processing system 104 can command device 1 108 through device N 114 to adjust environmental parameters in accordance with learned user preferences. In other embodiments, camera 624 may be used as a depth sensor to determine a location of the user (e.g., user 116) in a local coordinate system associated with environment controller 102.

A power monitor 626 included in some embodiments of sensing system 106 is configured to monitor power levels being consumed by environment controller 102 and by device 1 108 through device N 114. Associated power data can be used to measure energy consumption and adjust the environmental parameters accordingly to save energy. An output of power monitor 626 is used for troubleshooting and health monitoring, and also to determine if any component of environment controller 102 or device 1 108 through device N 114 is non-functional.

In some embodiments, sensing system 106 includes a pressure sensor 628 that is configured to measure an altitude, or height, associated with environment controller 102. In particular embodiments, data from pressure sensor 628 is used to determine an altitude, or a Z coordinate, of an object in the environment as sensed by sensing system 106. Details about this process are provided subsequently. Pressure sensor 628 can also be useful in detecting any doors and windows of the environment being opened or closed.

In some embodiments, sensing system 106 includes a magnetometer 630 that, in conjunction with accelerometer 614 and gyroscope 612 functions as an inertial measurement unit (IMU) that is configured to make angular measurements associated with environment controller 102.

Figure 7:
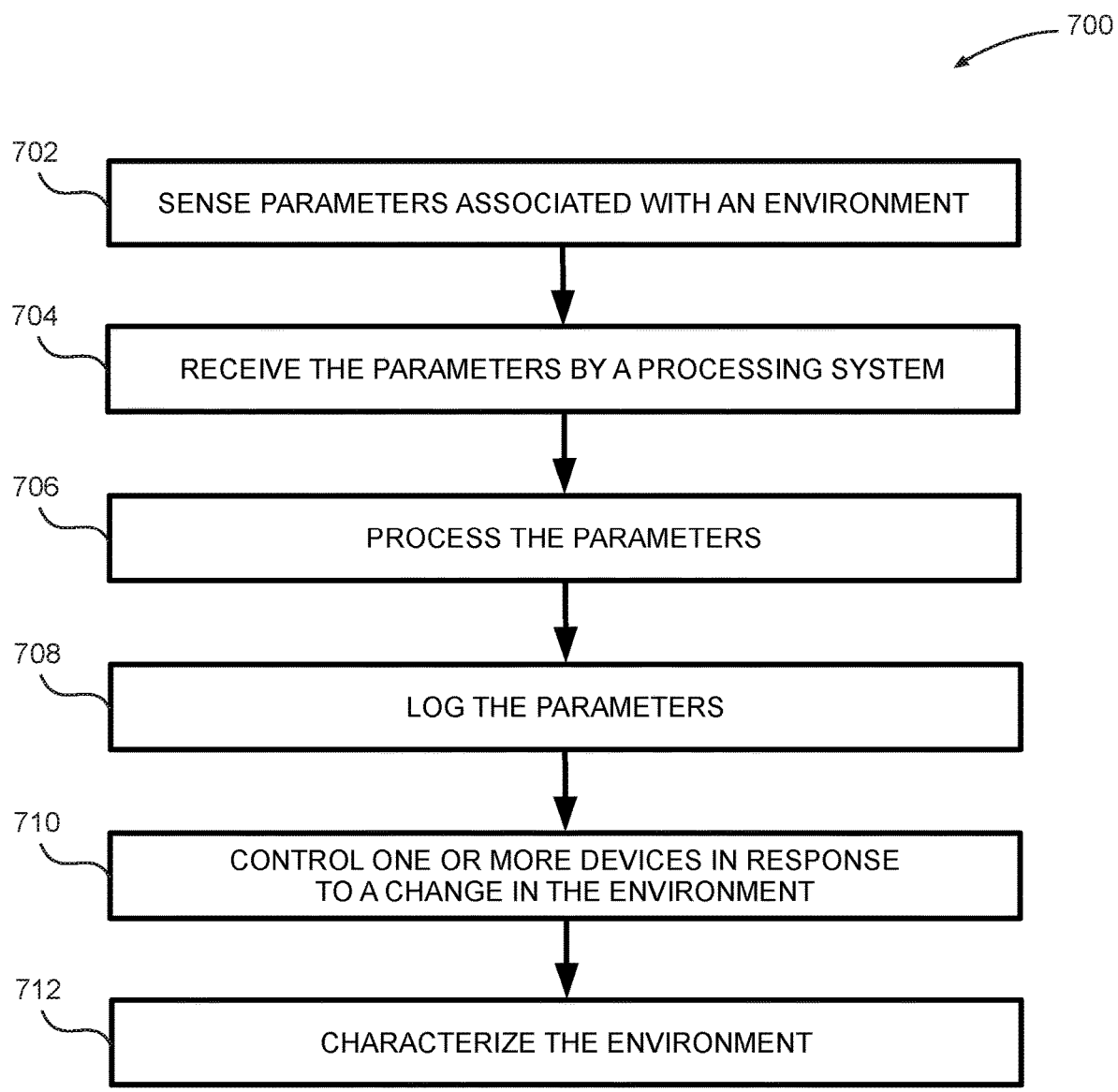
FIG. 7 is a flow diagram depicting an embodiment of a method to characterize an environment.

FIG. 7 is a flow diagram depicting an embodiment of a method 700 to characterize an environment. At 702, the method senses parameters associated with an environment such as environment 101. In some embodiments, the sensing is performed by sensing system 106, and the parameters are environmental parameters that include temperature, ambient light, humidity, and so on. At 704, parametric data associated with the parameters as generated by sensing system 106 is received by processing system 104. At 706, processing system 104 processes the parametric data. At 708, the method 700 logs the parameters. In some embodiments, the logging process is performed by processing system 104. In particular embodiments, the data is logged in memory 204. At 710, the method controls one or more devices, such as device 1 108 through device N 114, responsive to a change in the environment (i.e., a change in one or more environmental parameters), as discussed herein. Finally, at 712, the method 700 characterizes the environment. In some embodiments, a characterization of the environment is performed by processing system 104, and includes generating a map of the environment. Processing system 104 might measure a high humidity level in an environment and characterize the environment as a bathroom. Or, processing system 104 might measure a higher ambient temperature and characterize the corresponding environment as a kitchen. In another example, processing system 104 might use microphone 616 to characterize an environment as a living room based on microphone 616 generating audio data corresponding to music that might be played in a living room. Using these characterizations, environment control system 100 may provide room labeling suggestions to user 116. An alternative characterization of the environment by environment control system 100 includes a characterization based on an occupancy level of the environment. In some embodiments, environment control system 100 characterizes the environment using an occupancy pattern of a user. For example, bathrooms are usually small in size, exhibit high humidity events and are mostly occupied by one person. Bedrooms lights are usually off for long periods when occupied at night, living rooms have the highest occupancy count, and so on.

Figure 8:
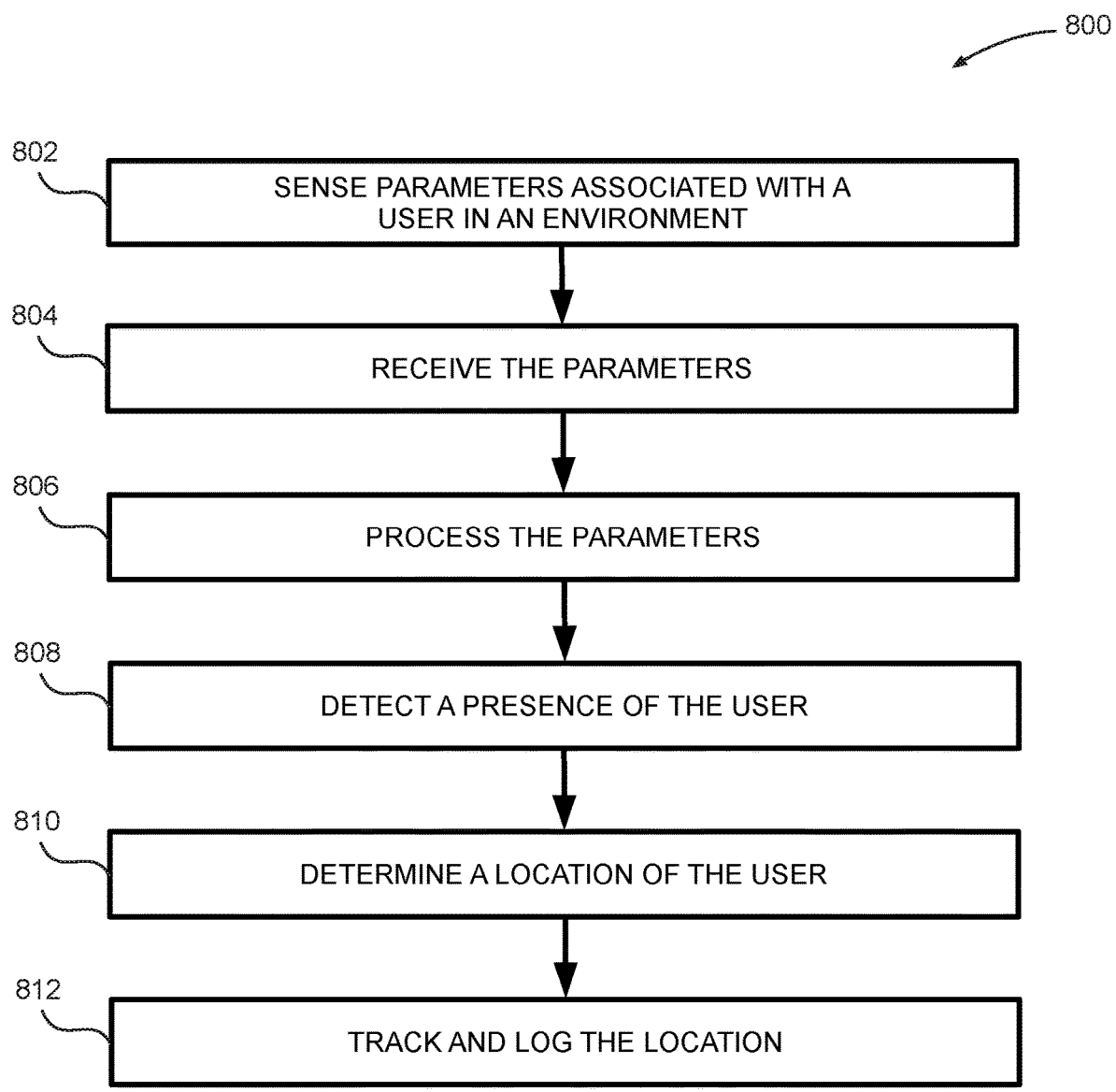
FIG. 8 is a flow diagram depicting an embodiment of a method to determine a location of a user.

FIG. 8 is a flow diagram depicting an embodiment of a method 800 to determine a location of a user. At 802, the method senses parameters associated with a user in an environment such as environment 101. In some embodiments, radar 602 included in sensing system 106 is configured to generate parametric data associated with a position of a user (or occupant) in an environment. Next, at 804, the method receives the parameters (i.e., the parametric data). In some embodiments, processing system 104 is configured to receive the parametric data. At 806, the method processes the parameters, or the parametric data. In some embodiments, this processing is performed by processing system 104. Next, at 808, responsive to the processing, the method detects a presence of the user. Next, at 810, the method determines a location of the user. In some embodiments, processing system 104 computes the location of the user in a local polar coordinate system referenced to environment controller 102. Finally, at 812, processing system 104 tracks and logs the location of the user. This tracking and logging process is performed over a period of time, allowing environment controller 102 to log a temporal history of user movement in the environment and generate a map associated with the user occupancy pattern.

Figure 9:
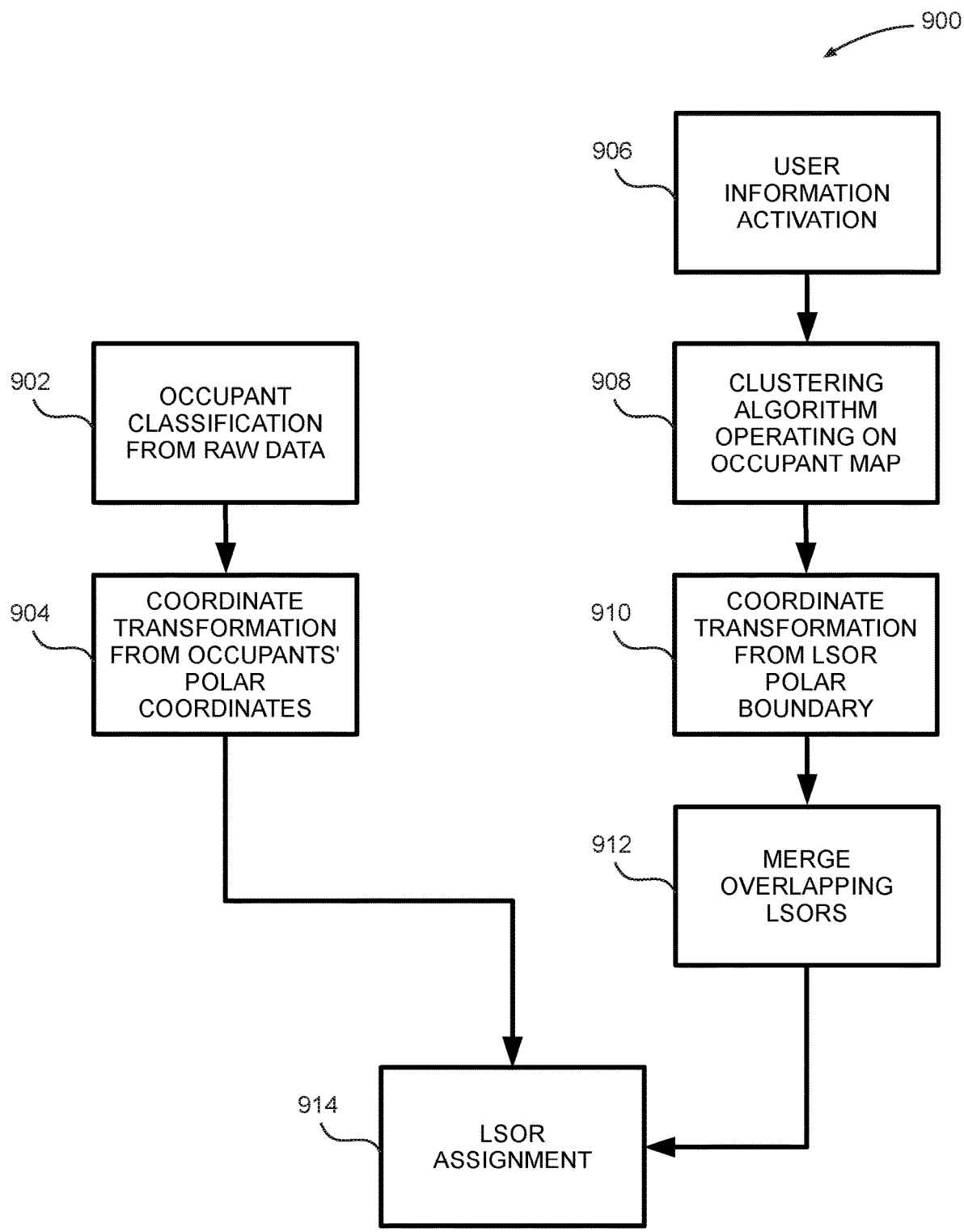
FIG. 9 is a flow diagram depicting an embodiment of a method to determine an LSOR assignment.

FIG. 9 is a flow diagram depicting an embodiment of a method 900 to determine an LSOR assignment. At 902 the method performs occupant classification from raw data, where the term "occupant" is used synonymously with the term "user" or the term "target." In some embodiments, occupant classification is performed by target classifier 402 responsive to raw data being received by processing system 104 from radar 602. In some embodiments, step 902 may include an occupant classification for multiple occupants, with data generated by a plurality of environment controllers such as environment controller 102. This step classifies all occupants in the environment, while distinguishing the occupants from other objects such as pets, furniture, walls and so on. In some embodiments, occupant classification may be performed using a classifier neural network that reads in inputs such as raw data generated by radar 602. In some embodiments, raw data generated by radar 602 includes a reflected cross section of an object, a range of the object, a speed of the object, and one or more angles (bearing) of the object. In some embodiments, these angles include an azimuth and elevation of the object. This raw data enables the neural network to classify a detected object appropriately.

In some embodiments, the occupant classification may include generating a set of polar coordinates for each user, in a coordinate system local to the corresponding environment controller. This operation may be performed by occupant classifier 402. Next, at 904, the method performs a coordinate transformation from each set of the occupants' polar coordinates. In some embodiments, this step is performed by occupant coordinate transform 404 that generates a set of transformed coordinates in a Cartesian coordinate system for each user, where each set of transformed coordinates is associated with a global Cartesian coordinate system that is associated with the entire environment. An output of this step is an XYZ position associated with each occupant in the global Cartesian coordinate system. In some embodiments, the XYZ position is referred to as "XYZ unified coordinates."

To construct a common coordinate system reference that implements the XYZ unified coordinate system, a range between each environment controller in the environment must be determined. In some embodiments, this is accomplished by using a received signal strength associated with an RF signal generated by an environment controller, digitally-modulated radar waveforms, or a unique motion profile generated by a speaker or a vibrating reflector and can be uniquely detected by the sensing system such as radar 602. Once a range of each environment controller in an environment is determined relative to a specific environment controller, a system of $n \times (n-1)/2$ equations can be generated, where n is a total number of environment controller in the environment of interest. Next, a reference environment controller is selected as an origin of the global XYZ coordinate system. This results in $2 \times (n-1)$ unknowns, with the multiplication factor of two being used to account for the X and Y coordinates. This implies that as long as $n \geq 4$, the method 900 can always resolve these equations. For example, if a specific environment controller, using radar 602, determines an occupant range as $R_{occ}$ and a corresponding azimuth angle as $Az_{occ}$, then assuming that method 900 has determined an XY position of each environment controller, step 904 performs its computation by applying the following equations:

$$X_{occ}=X_{controller}+R_{occ} \times \cos(Az_{occ}-Az_{controller})$$

$$Y_{occ}=Y_{controller}+R_{occ} \times \sin(Az_{occ}-Az_{controller})$$

In the above equations, $AZ_{controller}$ is a directional angle shift between a specific environment controller and the controller selected as the origin of the global XYZ coordinate system. This angle could be determined by the aid of an Inertial Measurement Unit (IMU) or a magnetometer sensor associated with an associated environment controller. Speed information about the object can also be used between different environment controllers to identify objects. In order to resolve the third dimension, Z, the environment controllers rely on data from pressure sensor 628 that provides altitude measurements with good absolute accuracy. Step 904 resolves a Z coordinate for a detected object (or occupant) by applying the following equation:

$$Z_{occ}=Z_{controller} \pm R_{occ} \times \sin(AI_{occ}-AI_{controller})$$

where $Z_{controller}$ is measured by pressure sensor 628, and $AI_{occ}-AI_{controller}$ is a corresponding altitude angle in reference to the origin controller.

In some embodiments it is possible to use radar data to translate the polar position data to a 3D global Cartesian coordinates (XYZ) directly without relying on pressure sensor 628. One common method to measure the range between multiple environment controllers is to detect a Bluetooth Low Energy (BLE) signal strength, where each environment controller is equipped with a BLE module (not shown).

Due to the nature of indoor environments, where multiple obstacles may be present in the way of a propagating signal, the received signal's energy level and path may be impacted along the way. These disturbances can noticeably impact the system's ability to accurately detect absolute position. To account for this, the system can take advantage of radar 602 and its more accurate range measurements as well as angular information. This can be done for the portion of environment controllers that are in a directional coverage of each other's radar. The idea is based on a "time of flight," or "ToF" concept. Since the radar used employs a variable frequency continue pulse transmitter, a unique signature information can be modulated to identify each environment controller. For example, an environment controller K1 can now transmit a special ToF signal. An environment controller K2 can detect the transmitting source and respond with another ToF signal delayed by a fixed known amount from the moment K2 received signal from K1. Once K1 receives and detects K2 ToF signal, it can now use the timestamp information of this signal and calculate the time of flight between K1 and K2 as shown in the equation below:

$$\text{ToF}(K_1-K_2)=K_1\text{ReceiveTimestamp}-K_1\text{TransmitTimestamp}-K_2\text{FixedDelay}$$

Once the ToF is known, the range can be calculated as follows:

$$\text{Range}(K_1-K_2)=\text{ToF}(K_1-K_2) \times c/2,$$

where c is the speed of light. The above method eliminates the need to have a synchronized clock between controllers. In other embodiment, a synchronized clock between controllers can be implemented and utilized for the above calculation. Hardware associated with radar 602 can also take advantage of the multiple-input, multiple-output "MIMO" phased array antennas configuration and beam forming concepts to produce accurate angular measurements. This added radar information for the portion of environment controllers in the system that are in each other's range, can be combined with the less accurate Bluetooth LE position information described above, to greatly improve the accuracy of the overall system. In other embodiments, the range is measured using radar sensor 602 in the same way the system measures occupants' positions. This is done by having the target controller enable a built-in speaker or a vibrator with possibly a magnifying reflector to oscillate at a certain and predetermined speed profile. This unique motion profile can then be used by the transmitting controller to isolate the target controller data from all other objects in the environment and as a result acquiring the target position data (including range and direction).

In a parallel process, step 906 detects user activation and deactivation of a specific load and triggers a clustering algorithm 908 to generate a map tacking the activating user while the load is active or for a specific amount of time. This sequence of steps allows the system to self-define LSORs. At 908, a clustering algorithm operates on the occupant map to generate multiple LSOR polar boundaries, where each LSOR polar boundary is a boundary associated with a specific LSOR in a local coordinate system corresponding to an associated environment controller. At 910, a coordinate transformation from each LSOR polar boundary transforms each LSOR polar boundary into a Cartesian coordinate system, to construct an LSOR XYZ boundary for each LSOR. The transformation from polar to Cartesian coordinates is performed using the methods described above for step 904, and each LSOR XYZ boundary is referenced to a global Cartesian coordinate system associated with all environment controllers in the environment. At 912, any overlapping LSORs are merged together to generate a plurality of modified LSOR XYZ boundaries. In some embodiments, a list of final LSORs is equal to n, where n is a number of loads in the environment. Prior to a merge, an LSOR is associated with a particular environment controller and a load zone in the environment. Post-merge, an LSOR is associated only with the corresponding load zone.

For the LSOR boundaries to be accurate approximations, it is essential to only monitor activating occupants' movements and ignore all other occupants. For example, if an occupant activates the bedroom light and occupies the bedroom space only while other rooms are occupied by other occupants, the system must ignore those occupants' movements since they were not the ones who activated the bedroom light. This will allow the bedroom light LSOR to only cover the bedroom space and not include adjacent rooms. In other words, environment control system 100 can be designed to track the location of a selected user in an environment that includes a plurality of users. In this case, environment controller 102 receives the user input from the selected user and controls the devices in accordance with the user input. In embodiments where only a sensor input is used to detect a user activation or deactivation of a load, an occupant's movements could be compared against a corresponding load transition event to distinguish the activating user from the other users. For example, when detecting a sudden increase in an ambient light level, this transition could be associated with an activation event, and the occupants' movement profiles could be evaluated to determine the activating user if there are more than one user. For example, the activating user motion profile would most likely experience a major motion associated with the user accessing the lighting controller, which may be followed by a short period of steady motion at the moment of the light transition followed by another major motion. This motion profile could be uniquely differentiated from all other users' motion profiles. In some embodiments, user preferences associated with the selected user are given priority over user preferences associated with other users in the environment.

Finally, at 914, method 900 uses the XYZ position associated with each occupant and the LSOR boundaries to generate an LSOR assignment list in the environment. Once the method 900 defines LSOR boundaries as described in step 912, it then can assign an LSOR value to each detected occupant based on their position in reference to data associated with LSOR boundaries. This is done in step 914. Once a list of occupants and their LSORs assignments is constructed, step 914 counts a number of occupants (i.e., a number of people) in each LSOR. This count is used as a basis for determining how environmental parameters need to be controlled or modified. Another important measurement for environment control system 100 is a total count of occupants in the space which can also be calculated at step 914. In order for this value to be accurate, the count process must consider that some occupants may be occupying more than one overlapping LSORs. However, since occupants' positions are identified against the unified XYZ coordinates system defined earlier, overlapping occupants will have the same coordinates values. As a result, the system can ignore overlapping occupants and an accurate count can be calculated.

An LSOR is a region that is usually occupied when a specific load (i.e., a device) is active. This level of abstraction is proven useful because it allows the algorithm to have a better understanding of how the space is used with relation to the loads' settings. For example, when placing an occupancy sensor in a room and the desire is for that sensor's occupancy information to deliberately control that room's light only without affecting adjacent rooms, then the placement of the sensor must be done in a way such that its range of detection covers the whole room and only that room. In this sense, the LSOR for that load is defined by that room area. In contemporary systems, a customer (or installer) accomplishes this by making proper adjustments to align the sensor's detection region to the desired occupancy area, which can prove inconvenient, tedious and inaccurate. During the training phase associated with self-defining an LSOR, when an occupant activates a specific load, the system logs the occupant's movements until they deactivate the same load or a predefined time has expired, whichever event occurs first. In other words, the environment control system 100 logs a temporal history of an occupant's movements in an environment during load activation, allowing the system to dynamically detect any boundaries for a region or a room in the environment that is serviced by that specific load.

Figure 10:
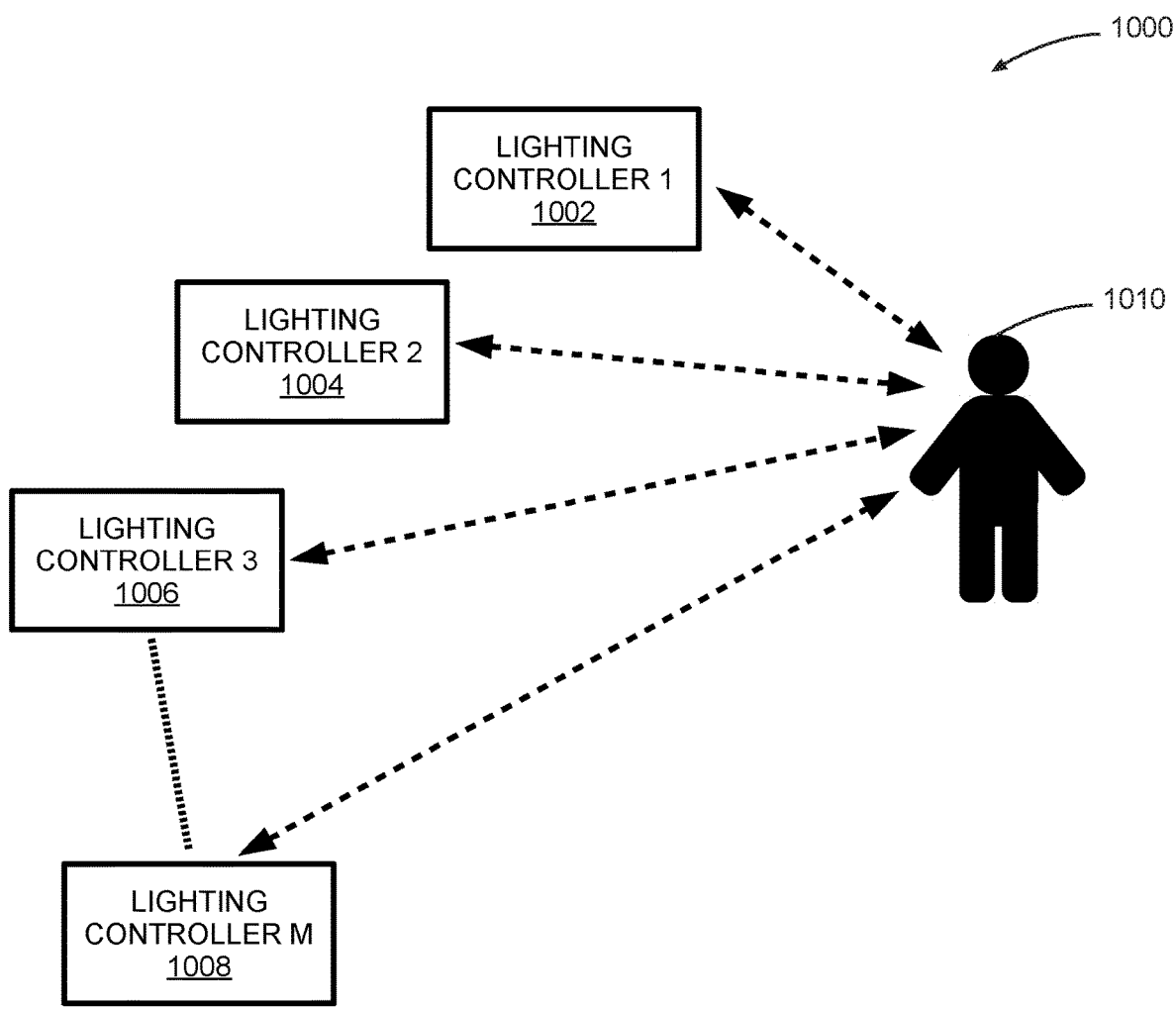
FIG. 10 is a block diagram depicting an embodiment of an installation that uses multiple lighting controllers.

FIG. 10 is a block diagram depicting an embodiment of an installation 1000 that uses multiple lighting controllers. In some embodiments, environment controller 102 may be packaged in a form of a lighting controller with an appearance similar to contemporary lighting controllers that are configured to modify ambient light levels in an environment with manual user input. When packaged in this way, environment controller 102 includes additional interfaces to implement the features described herein. Details about the additional interfaces are described subsequently.

In some embodiments, installation 1000 includes a lighting controller 1 1002, a lighting controller 2 1004, a lighting controller 3 1006, through a lighting controller M 1008. In particular embodiments, lighting controller 1 1002 through lighting controller M 1008 are installed in an environment and individually include all functionalities of environment controller 102. A user 1010 is able to individually control settings associated with each of lighting controller 1 1002 through lighting controller M 1008, to control one or more environmental parameters through a plurality of devices (not shown in FIG. 10).

Figure 11:
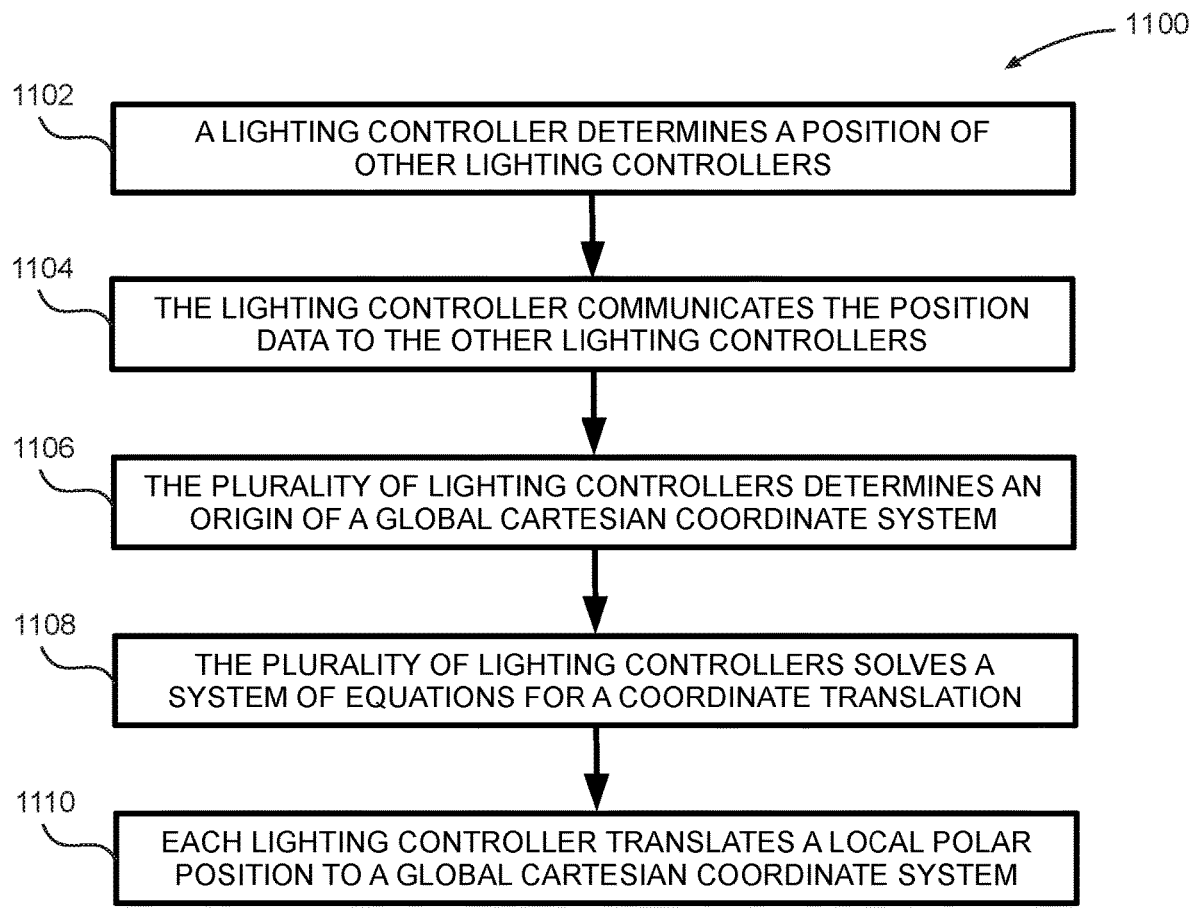
FIG. 11 is a flow diagram depicting an embodiment of a method to perform a coordinate system translation.

FIG. 11 is a flow diagram depicting an embodiment of a method 1100 to perform a coordinate system translation. Method 1100 is an algorithmic flow that captures a functionality of steps 904 and 910. At 1102, a lighting controller such as lighting controller 1 1002 determines a position of other lighting controllers (such as lighting controller 2 1004 through lighting controller M 1008) in an environment. In some embodiments, this determination is performed using techniques described earlier, such as ToF measurements using radar waveforms and received signal strength of BLE signals. In other embodiments and when some lighting controllers are out of a range or a field of view of other lighting controllers, each lighting controller can share its directional range data of the lighting controllers in its field of view and as a result, the system collectively can resolve the distance between all lighting controllers and be able to carry on step 1102. This is possible since the radar sensor can provide range and angular data (direction) as well. Next, at 1104, the lighting controller communicates the measured range data for all lighting controllers to the other lighting controllers, where all lighting controllers are communicatively coupled with each other. At 1106, the plurality of lighting controllers collectively decides on one controller as an origin coordinates for a global Cartesian coordinate system. This could be done randomly or by relying on lighting controllers' unique identities or functionalities. At 1108, the plurality of lighting controllers solves a system of equations determining a unique coordinate for every lighting controller against the unified global Cartesian coordinate system. This step can be done at one of the lighting controllers, at some or all of them, or in the cloud. Finally at 1110, once each lighting controller is aware of its own global Cartesian coordinates, it uses these coordinates to translate its local polar position data to the global Cartesian coordinate system using the techniques described above (e.g., step 904).

Figure 12:
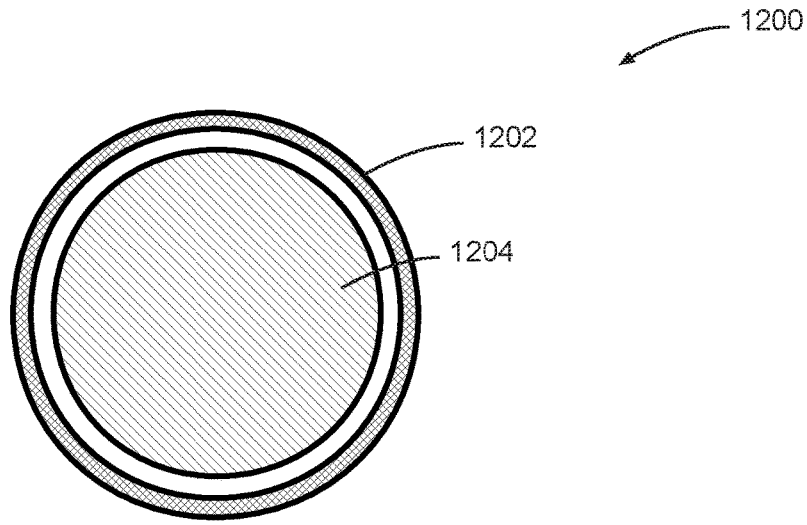
FIG. 12 is a schematic diagram depicting an embodiment of a lighting controller user interface.

FIG. 12 is a schematic diagram depicting an embodiment of a lighting controller user interface 1200. In some embodiments, lighting controller user interface 1200 presents a user interface for a lighting controller. In particular embodiments, lighting controller user interface 1200 includes a circular main button 1204 and an adjustment dial 1202. In some embodiments, lighting controller user interface includes additional buttons that allow user 116 to control a temperature associated with the environment, and also allow user 116 to input and control one or more security features associated with the environment.

When lighting controller user interface 1200 is first installed, it runs in a manual mode, where pressing circular main button 1204 toggles a power supply to a load electrically coupled to lighting controller user interface 1200. Rotating adjustment dial 1202 in "manual mode," amplifies or reduces the connected load level depending on a direction of rotation. Once the associated lighting controller has collected enough information about the environment and its occupants' habits, the lighting controller switches to an autonomous mode, where settings associated with environmental parameters are be controlled automatically by the lighting controller without a need for the occupants to interact with the installed lighting controller. However, in situations where existing environmental parameter settings do not match the user's liking, they can either tune in the active system's output by turning adjustment dial 1202, or they can press circular main button 1204 which in this mode, acts as a "dislike" button. An associated "dislike" function triggers an autonomous environment control algorithm (described subsequently) associated with processing system 102 to re-run, this time with the added information of the customer's disliking the current environmental parameters. This data improves the algorithm's next prediction odds in matching the user preference. A second press within a short period switches the mode of operation from "autonomous" back to "manual" for brief period of time to avoid any confusion. In some embodiments, this period of time may be a minute long.

Figure 13A:
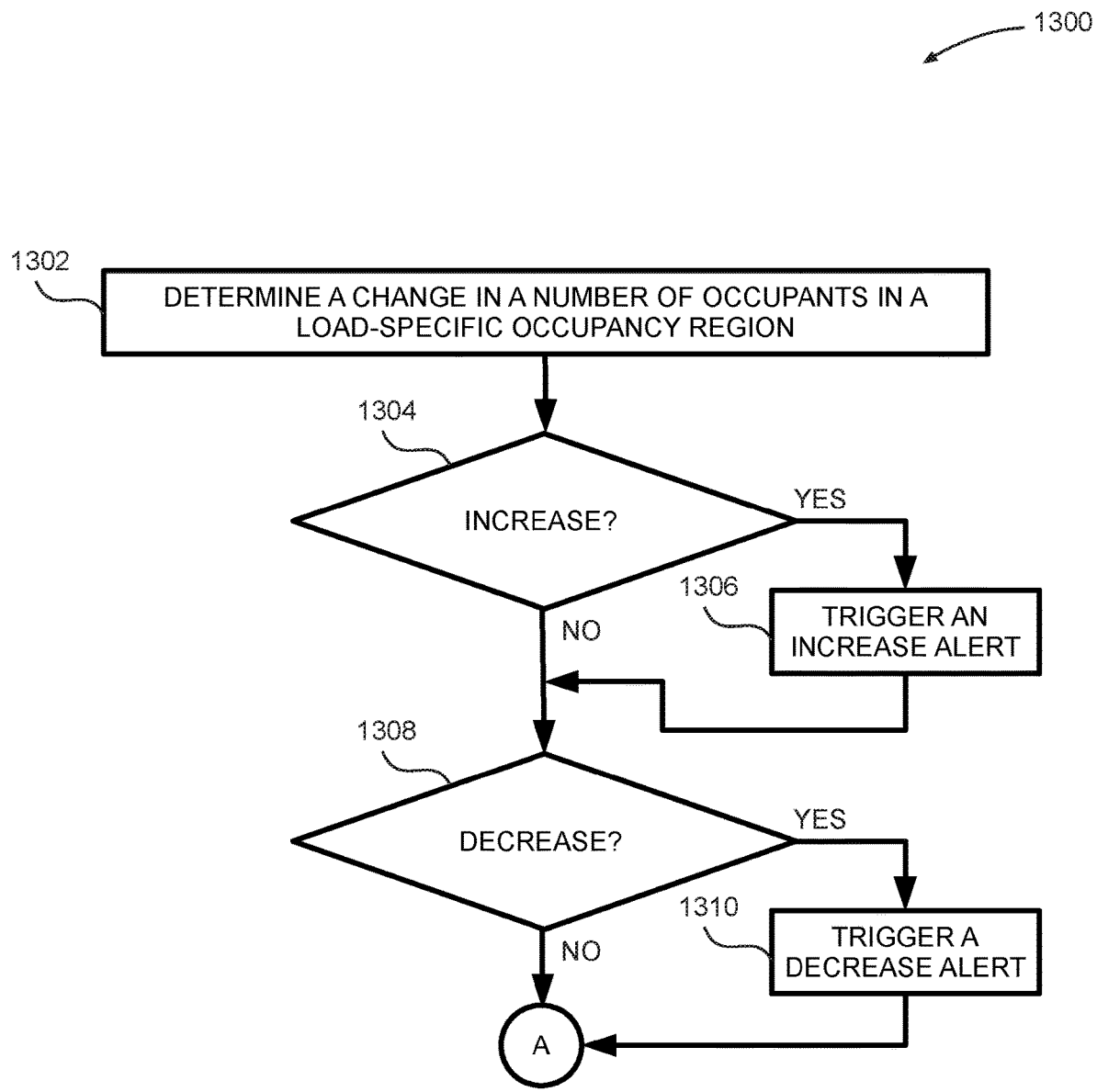
FIGS. 13A and 13B are flow diagrams depicting an embodiment of a method to determine a change in a number of people in a load-specific occupancy region and issue one or more alerts in response to the determination.

FIG. 13A is a flow diagram depicting an embodiment of a method 1300 to determine a change in a number of people in a load-specific occupancy region and issue one or more alerts in response to the determination. At 914 in FIG. 9, method 900 determines a number of occupants in an environment. At 1302, method 1300 determines a change in a number of occupants in a load-specific occupancy region. In some embodiments, this is achieved by comparing a number of occupants in the environment measured at a given time instant with a number of occupants in the environment measured at a previous time instant, where all measurements are determined based on data generated by sensing system 106. At 1304, the method checks to determine whether the change is an increase. If the change is an increase, the method goes to 1306, where an increase alert is triggered. The method also triggers an autonomous environment control algorithm associated with processing system 102 to adjust the environment according to the count change. This autonomous control algorithm is described subsequently. An increase alert, generated by processing system 104, is used to alert one or more users about an increase in a number of occupants in the environment. The method then goes to 1308. At 1304, if there is no increase in the number of occupants, then the method goes to 1308, where the method checks to determine whether the change is a decrease. If the change is a decrease, the method goes to 1310, where a decrease alert is triggered. The method also triggers an autonomous environment control algorithm associated with processing system 102 to adjust the environment according to the count change. This algorithm is described subsequently. A decrease alert, generated by processing system 104, is used to alert one or more users about a decrease in a number of occupants in the environment. The method then goes to A. At 1308, if there is no decrease in the number of occupants, then the method goes to A.

Figure 13B:
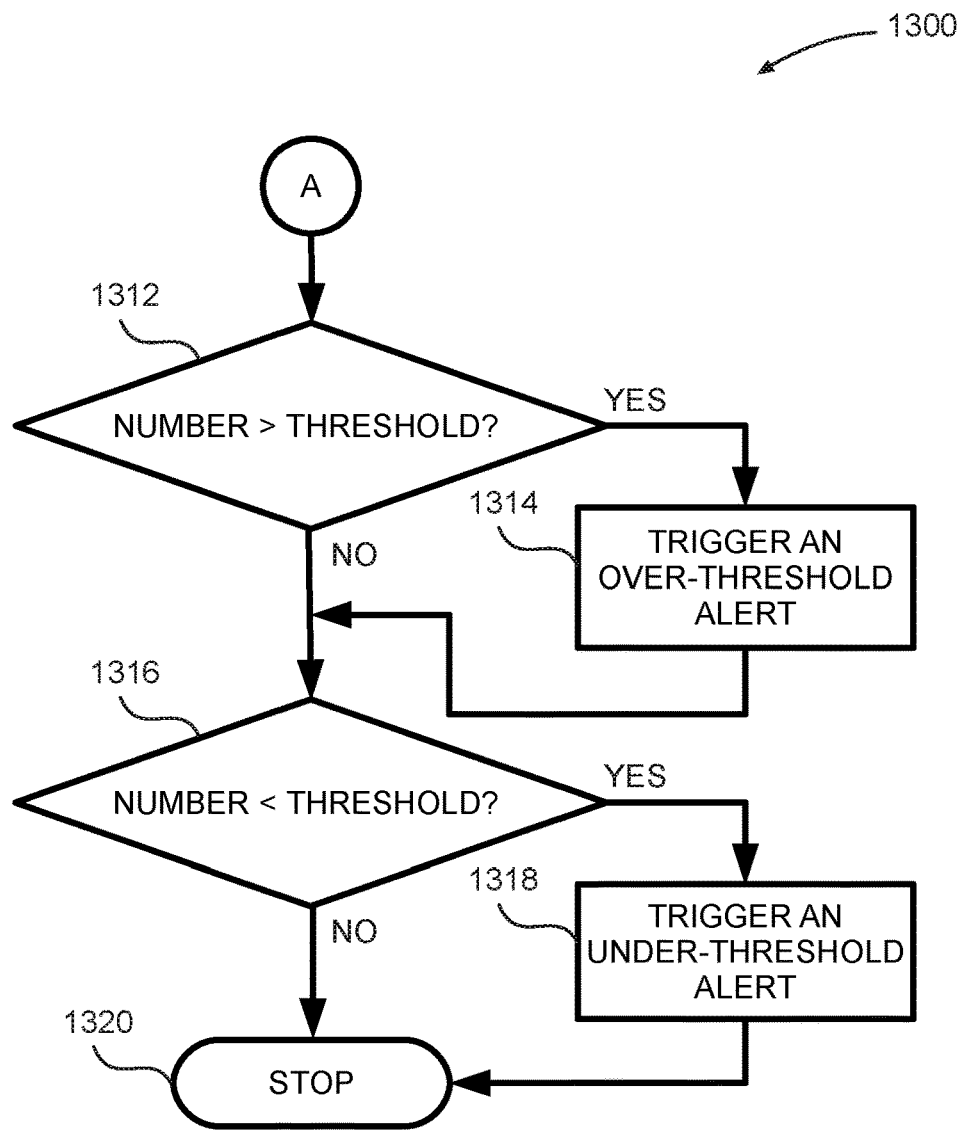

FIG. 13B is a flow diagram depicting a continued description of method 1300. Starting at A, the method goes to 1312, where it checks to determine whether a number associated with the change is greater than a first threshold. If the number is greater than the first threshold, then the method goes to 1314, where an over-threshold alert is triggered. An over-threshold alert, generated by processing system 104, is used to alert one or more users that the number of occupants in the environment is greater than the first threshold. The method then goes to 1316. At 1312, if the number is not greater than the first threshold, then the method goes to 1316, where the method checks to determine whether a number associated with the change is less than a second threshold. If the number is less than the second threshold, then the method goes to 1318, where an under-threshold alert is triggered. An under-threshold alert, generated by processing system 104, is used to alert one or more users that the number of occupants in the environment is less than the second threshold. The method then terminates at 1320. At 1312, if the number is not greater than the first threshold, then the method terminates at 1320.

Method 1300 enables several applications of environment control system other than controlling environmental parameters. One such application is a security system that enhances the safety of the occupants and the environment. Such a security system can be controlled, armed or disarmed via any lighting controller in the environment. It can also be armed or disarmed by an application software running on, for example, a user mobile device. Since every environment controller is equipped with radar such as radar 602 that is capable of detecting motion, as well as having an ability to differentiate between humans and other types of objects (ex: pets), once the user arms the system through a user interaction or due to an autonomous control algorithm prediction, any human presence that results in an increase of the total human count, will trigger an alarm event generated by processing system 102. As a result, an alert could be sent to the user registered devices, a third-party monitoring agency and/or an accessory siren could be turned on given that the system was not disarmed before a predetermined grace period has expired. The user can disarm the system by accessing any of the lighting controllers, accessing the app in any of the registered devices after being authenticated, tag any of the lighting controllers with a special near-field communication (NFC) tag accessory that the user acquired as part of the system or tag a registered device with built-in NFC capability. The system can also be configured to automatically accept an increase in an occupant count without issuing an alarm if the increase is accompanied with a detection of a new registered device being in a range of the system's local wireless signal such as Bluetooth or WiFi.

One major advantage of the security feature described above is an ability to offer burglary intrusion detection while the environment is occupied, without an annoyance of false alarms. False alarms are a common complaint associated with contemporary motion sensors employed by traditional alarm systems. For example, ultrasonic or infra red motion sensors. Occupants or guests going into zones protected by these sensors and forgetting to disarm the system are a common source for false alarms, since these sensors will trip once a motion is detected regardless of the source. Alternatively, environment control system 100 can offer a motion detection strategy while the environment is occupied, without the annoyance of false alarms. This is accomplished by using radar 602 embedded in each environment controller 102. Radar 602 has greater resolution than standard motion detectors. An occupant detection capability associated with radar 602 coupled with post-processing by processing system 104 to enables motion detection while the environment is occupied. When user 116 arms the system, it logs a number of occupants, and now those occupants can roam the space freely since their total is always going to add up to the same value. However, the moment the system detects a motion coupled with a higher occupant count, the system must be disarmed within a predefined short period before it generates an alarm event. This is achieved by 1312 and 1314 in method 1300. Such a system offers an advanced security system that enables protection measures without adding complexity or inconvenience to a customer.

Another advantage of using environment control system 100 is that since the sensing element is distributed in devices (i.e., environment controllers) installed within the environment, an intruder does not have access to the indoor environment controllers without triggering an associated sensing element (e.g., radar 602) first. This may not be true for traditional security systems since the intruder might still have access to the perimeter window/door sensors before they are sensed. This flaw could enable the intruder to disable the device before being sensed if the sensor or its control signal wiring was not placed, installed or protected properly.

In addition to implementing functionalities that provide security and autonomous control, occupant count information can also offer the space owner's indication about how the space is being used. A feature of the system called "people-fencing" could be utilized for this purpose. For example, before a night out, parents could set the system up to send an alert to registered devices when an occupant count limit is violated (setup a max and/or min people fences). In turn, those alerts could indicate an unwanted gathering (house party) or a child leaving a residence at night. These functionalities are provided by steps 1312 and 1314 respectively in method 1300. In the commercial world this feature could be useful in spaces where it is supposed to be maned at all times (ex: security guard, reception desk, etc.) since an alert will be sent, if the occupancy count dipped below the limit. This functionality is provided by steps 1316 and 1318 in method 1300.

In some embodiments, environment control system 102 can be used to implement an autonomous room fencing system, where virtual fence is set up around individual room inside an environment. In this case, environment control system can generate a smart alert if the room gets occupied. This feature is useful to notify user 116 about undesired behaviors (ex: an airbnb guest or a dog walker entering a master bedroom).

Figure 14:
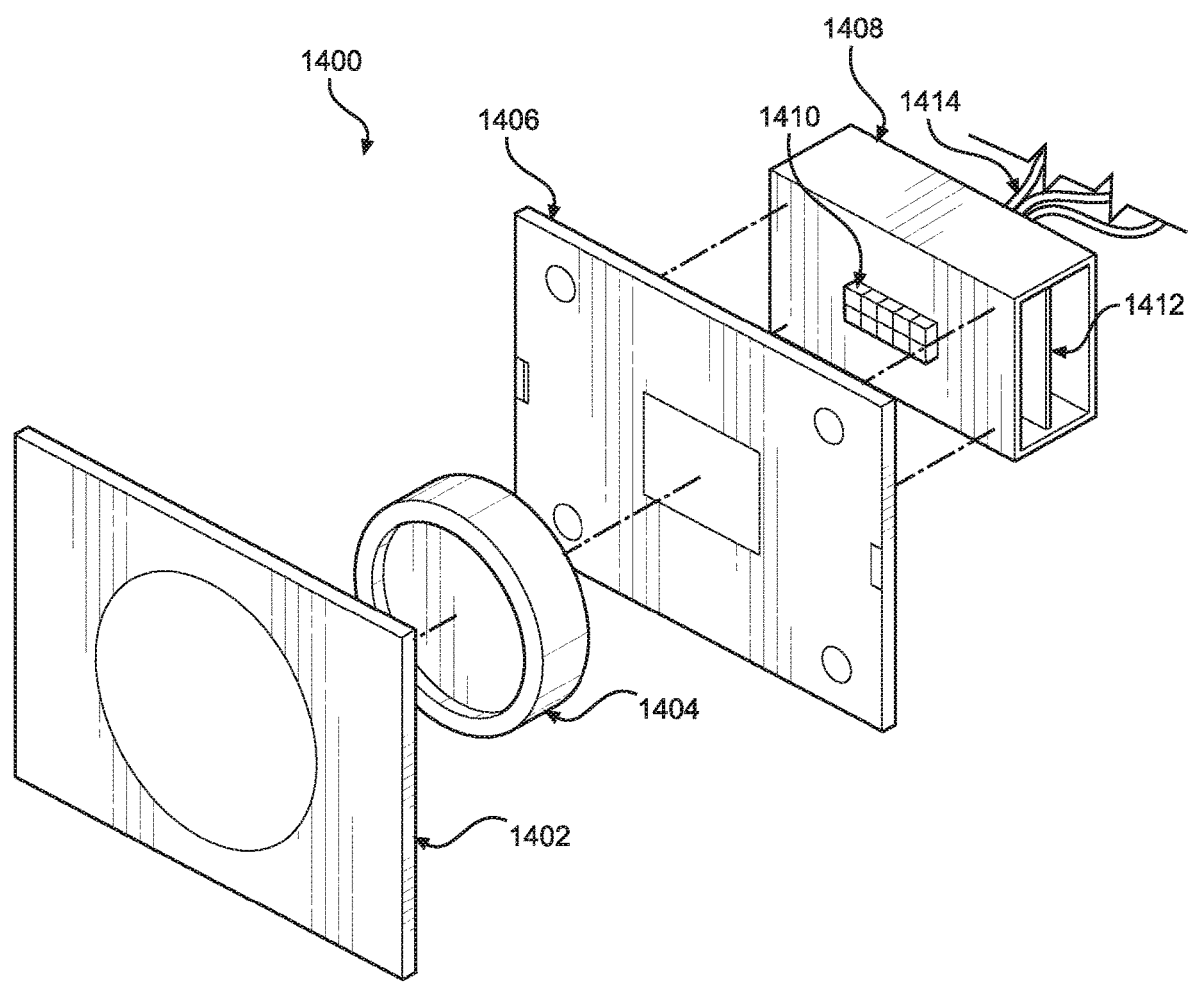
FIG. 14 is a schematic diagram depicting an expanded view of an interface element.

FIG. 14 is a schematic diagram depicting an expanded view of a lighting controller 1400. The keypad consists of a front cover 1402, an interface element 1404, a mounting frame 1406, and a power module 1408. In some embodiments, interface element 1404 is configured to present lighting controller user interface to a user. Mounting frame 1406 retains mechanical features to support the attachment to, for example, standard electrical wallboxes. In some embodiments, a design of mounting frame 1406 could be specific to a box size (e.g., 1-gang, 2-gang, etc.) and/or style (e.g., US or European). It is also possible to offer a universal frame design supporting various sizes and styles allowing the whole product design to support different types of applications and markets. Power module 1408 houses a power circuit board 1412 that is responsible for adjusting the power delivery to an electrically coupled load. Power module 1408 connects to the load using a load wiring 1414. Power module 1408 also connects to interface element 1404 through a connector 1410 which transports both power and communication signals.

Figure 15:
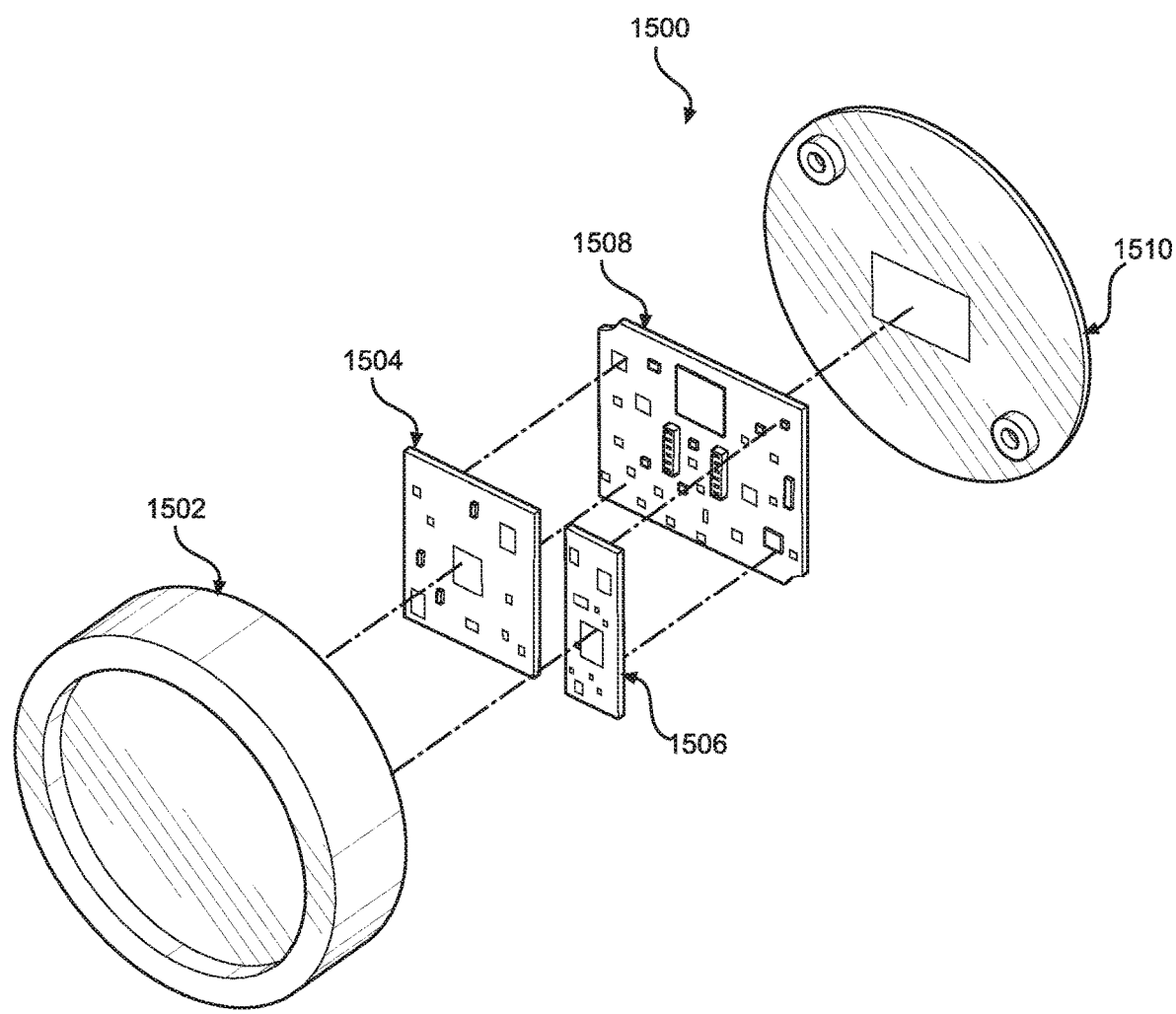
FIG. 15 is a schematic diagram depicting an embodiment of a lighting controller.

FIG. 15 is a schematic diagram depicting an expanded view of an interface element 1500. In some embodiments, interface element 1500 is identical to interface element 1404, and includes a user interface 1502, a sensor circuit board 1504, a communication circuit board 1506, and a logic motherboard 1508. A rear cover 1510 is screwed together with user interface 1502 to form interface element 1504. In some embodiments, sensor circuit board 1504 includes sensors associated with sensing system 106, such as MIMO radar, ambient light intensity/color, pressure, temperature, humidity, air quality, gyroscope, accelerometers, smoke and MEMS microphone as discussed earlier.

In some embodiments, communication circuit board 1506 supports different standard communication protocols such as Bluetooth BR/EDR, Bluetooth LE, WiFi NFC, and cellular. Communication circuit board 1506 enables a system of multiple environment controllers to communicate between each other as well as with nearby electronic devices, nearby modules and the Internet. Enabling NFC short-range communication allows an automatic pairing or detection of other environment controllers, as well as supported accessories or loads such as mobile devices, smart watches, wireless bulbs, wireless shades, smart appliances, key fobs, etc.

In some embodiments, logic motherboard 1508 acts a hub, electrically coupling all other circuit boards together and providing a way for power and communication signals to be routed across interface element 1500. In particular embodiments, logic motherboard 1508 also contains processing system 104 where autonomous control machine learning algorithms, or partial versions of thereof, are maintained and executed. Logic motherboard 1508 receives input data from sensor circuit board 1504 and communication circuit board 1506, and based on the autonomous control algorithm prediction, logic motherboard 1508 may transmit commands to control the attached power module such as power module 1408 and other remote components through supported communication protocols.

Figure 16:
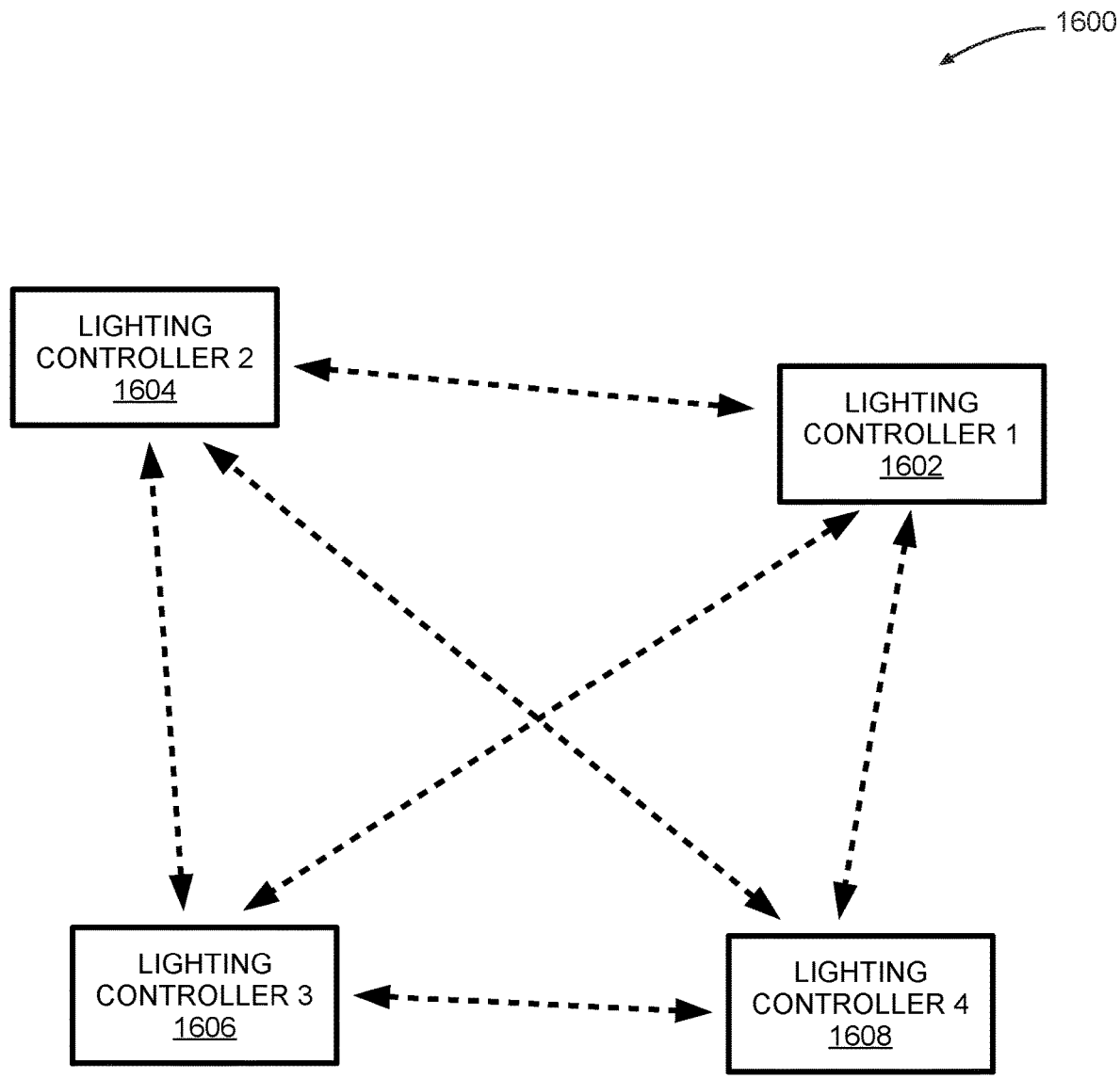
FIG. 16 is a block diagram depicting an embodiment of a networked system that includes multiple lighting controllers.

FIG. 16 is a block diagram depicting an embodiment of a networked system 1600 that includes multiple lighting controllers. In some embodiments, networked system 1600 includes a lighting controller 1 1602, a lighting controller 2 1604, a lighting controller 3 1606, and a lighting controller 4 1608. Each of lighting controller 1 1602 through lighting controller 4 1608 is wirelessly coupled with each of the other lighting controllers in networked system 1600. In some embodiments, the wireless coupling could include any combination of wireless protocols such as WiFi, Bluetooth, infra red links, NFC, and so on. Each wireless coupling is configured to transmit and receive both communication and ranging signals to implement different functionalities of environment control system 100, as discussed herein.

Figure 17A:
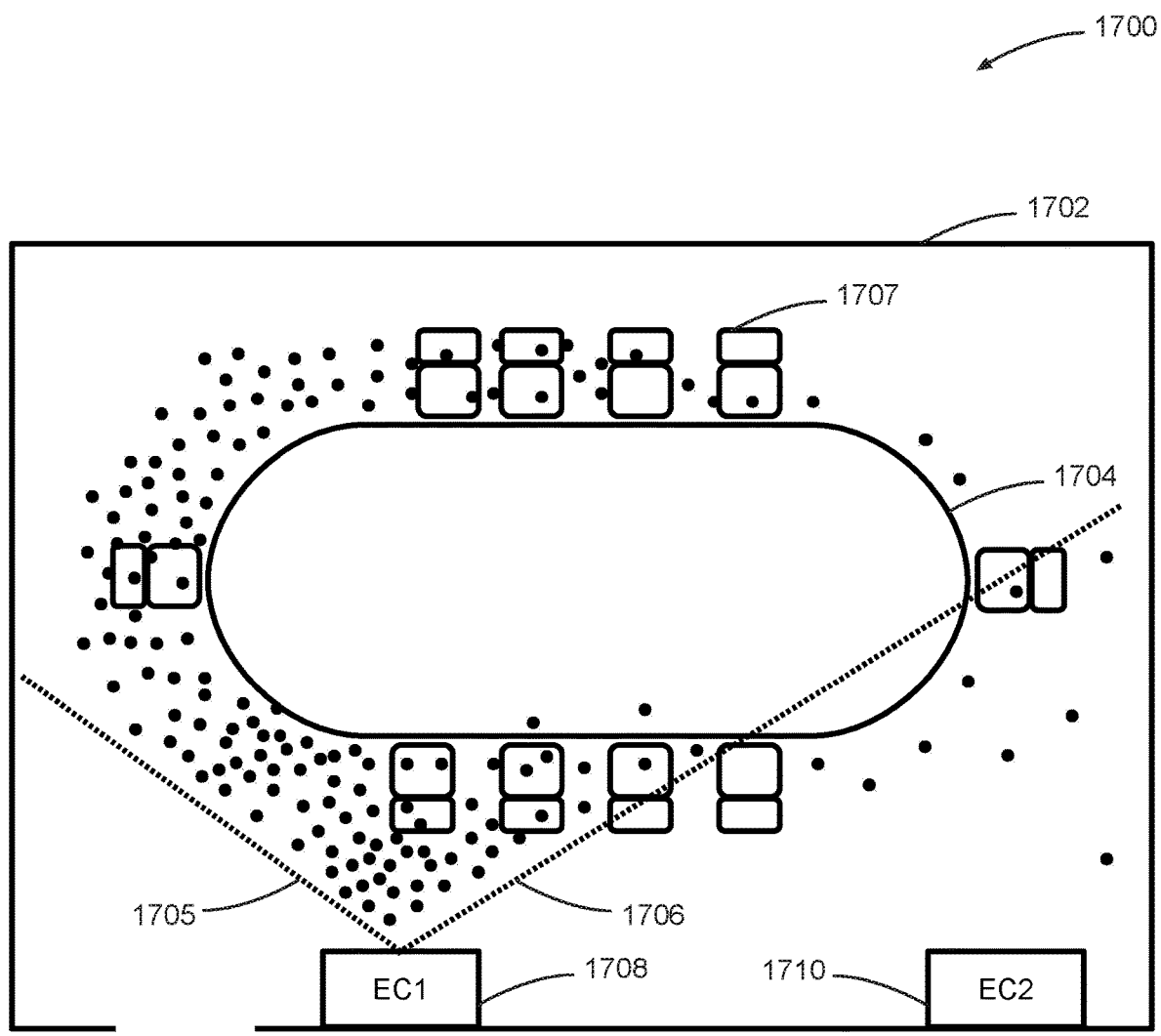
FIG. 17A is a schematic diagram of an environment, depicting a first step in determining a load-specific occupancy region (LSOR).

FIG. 17A is a schematic diagram of an environment 1700, depicting a first step in determining a load-specific occupancy region (LSOR). In some embodiments, environment 1700 includes a room 1702 that further includes a table 1704 and chairs such as a chair 1707, as shown in FIG. 17A. Room 1702 also includes an environment controller EC1 1708 and an environment controller EC2 1710. During a training phase, when an occupant in environment 1700 activates a one or more loads (i.e., one or more devices)

associated with the environment, environment controller EC1 1708 and environment controller EC2 1710 detect this event and log a temporal history of the occupant's motion in environment 1700. This logging processes continues till the occupant deactivates all of the one or more loads or when a predetermined time expires, whichever event occurs first. The black dots in FIG. 17A denote a temporal pattern of an occupant in room 1702.

In some embodiments, environment controller EC1 1708 has a field of view bounded by a boundary line 1705 and a boundary line 1706. Environment controller EC1 1708 is configured to temporally log a location history of the occupant while the occupant is in the field of view bounded by boundary line 1705 and boundary line 1706, throughout a period of time for which any load in environment 1700 is activated. Environment controller EC1 1708 runs a clustering algorithm (a form of unsupervised machine learning) to process data in the log. In some embodiments, this processing is performed by processing system 104, using step 908 as depicted in FIG. 9.

Figure 17B:
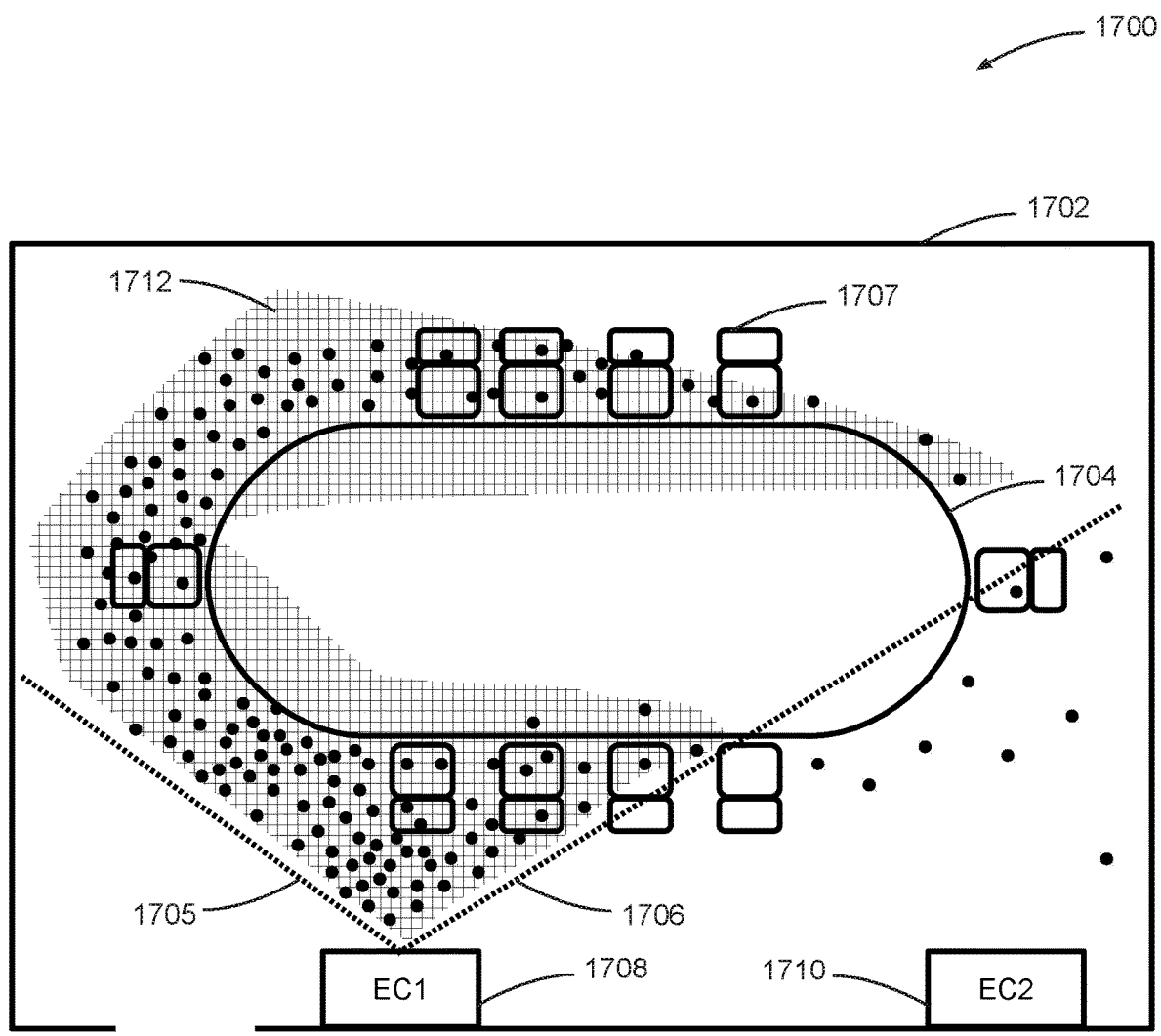
FIG. 17B is a schematic diagram of an environment, depicting a second step in determining an LSOR.

FIG. 17B is a schematic diagram of environment 1700, depicting a second step in determining an LSOR. Responsive to processing the temporal location history log of the occupant in environment 1700 as described above, environment controller EC1 1708 defines an LSOR 1712 that is local to environment controller EC1 1708.

Figure 17C:
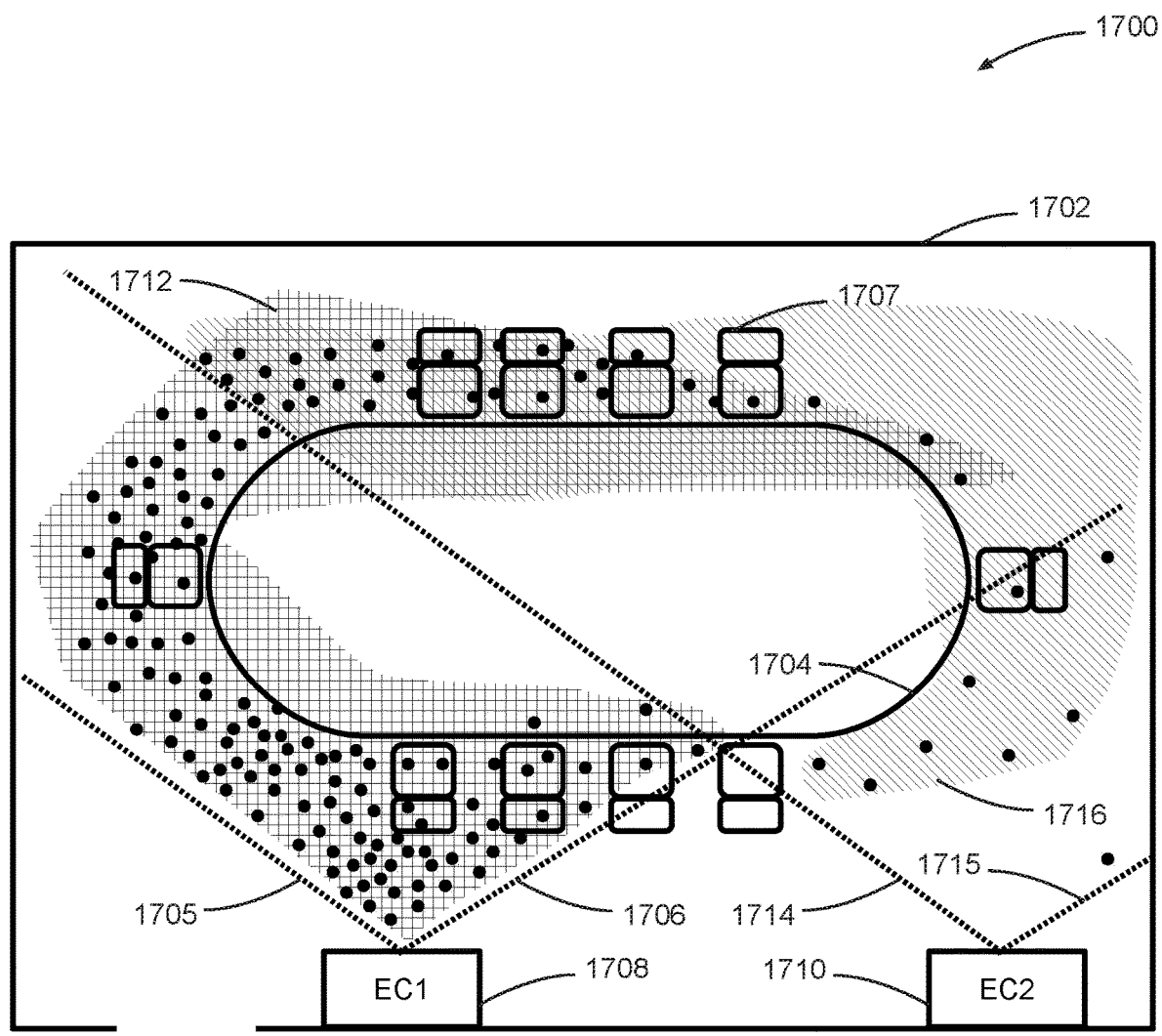
FIG. 17C is a schematic diagram of an environment, depicting a third step in determining an LSOR.

FIG. 17C is a schematic diagram of environment 1700, depicting a third step in determining an LSOR. In some embodiments, environment controller EC2 1710 is configured to temporally log a location history of the occupant while the occupant is in the field of view bounded by boundary line 1714 and boundary line 1716, throughout a period of time for which any load in environment 1700 is activated. Environment controller EC2 1710 runs a clustering algorithm (a form of unsupervised machine learning) to process data in the log. In some embodiments, this processing is performed by processing system 104, using step 908 as depicted in FIG. 9. Responsive to processing the temporal location history log of the occupant in environment 1700 as described above, environment controller EC2 1710 defines an LSOR 1716 that is local to environment controller EC1 1710. In this way, a combination of all environment controllers in an environment is used to define all "n by m" LSORs in the space where n donates the number of loads and m donates the number of environment controllers in the environment. These LSORs are defined in reference to a polar coordinate system associated with each detecting environment controller.

Figure 17D:
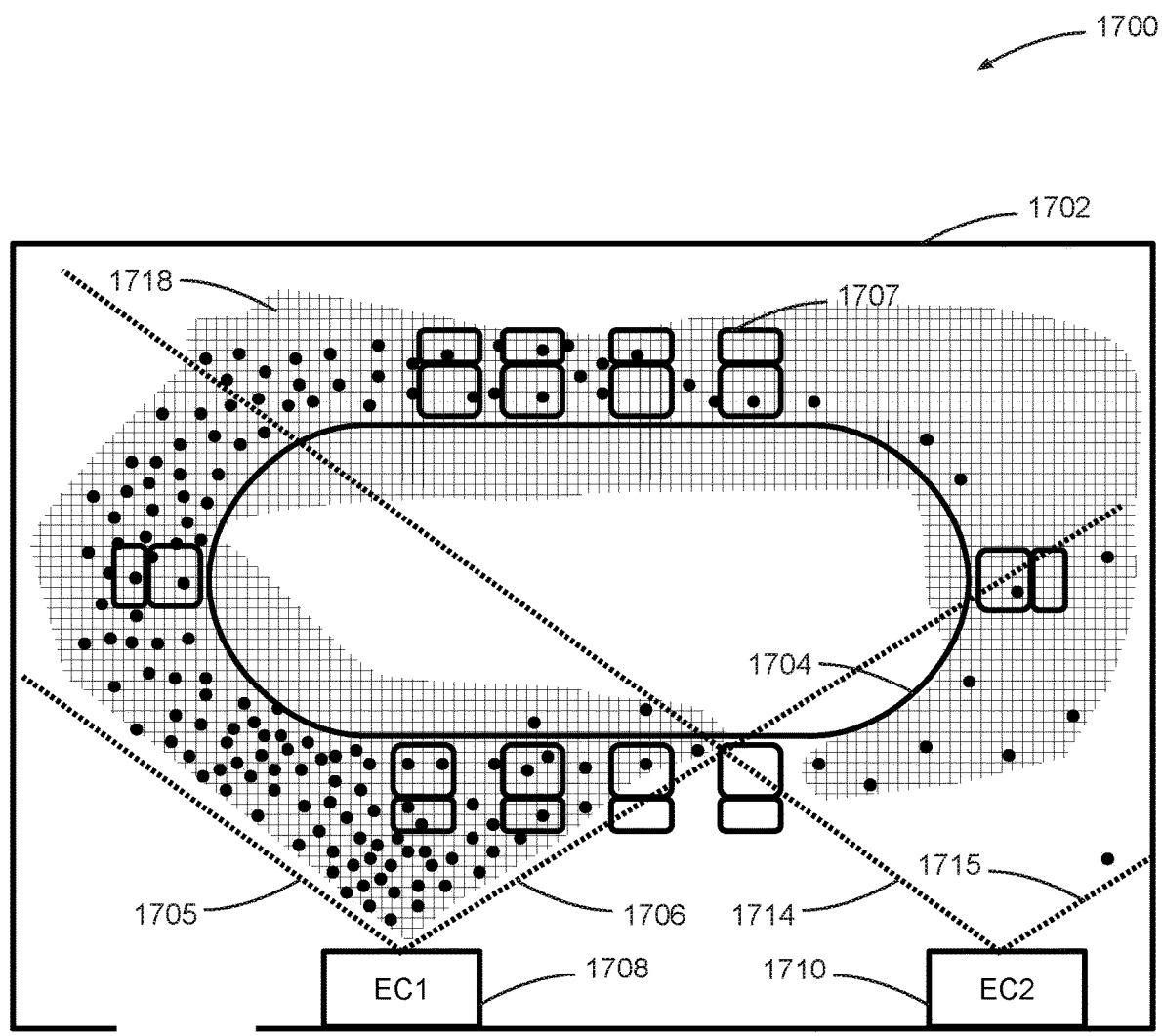
FIG. 17D is a schematic diagram of an environment, depicting a fourth step in determining an LSOR.

FIG. 17D is a schematic diagram of environment 1700, depicting a fourth step in determining an LSOR. In this fourth step, LSOR 1712 and LSOR 1716 are combined to form a composite LSOR 1718. To achieve this, coordinate transformations from the respective local polar coordinates to a global Cartesian coordinate system are performed, as presented in FIG. 9. In this way, the list of LSORs can be reduced to "n" items only, where "n" denotes a number of loads. In some embodiments, composite LSOR 1718 is determined after collecting enough logging data by environment controller EC1 1708 and environment controller EC2 1710. In this way, environment controller EC1 1708 and environment controller EC2 1710 generate a map of environment 1700 by temporally tracking the location of an occupant and defining associated load-specific occupancy regions.

Figure 18:
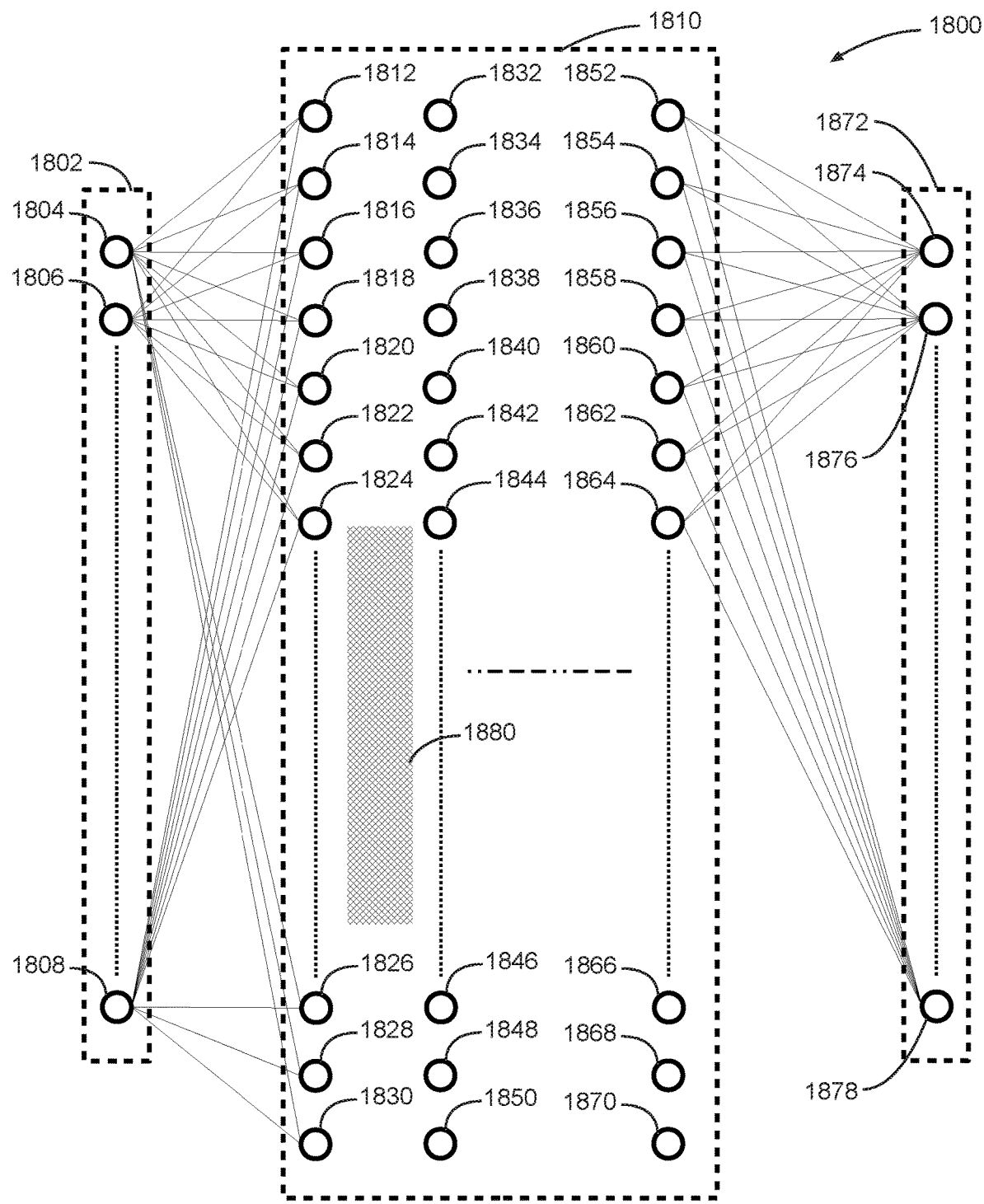
FIG. 18 is a schematic diagram depicting an embodiment of a neural network that may be used to implement certain functions of an environment control system.

FIG. 18 is a schematic diagram depicting an embodiment of a neural network 1800 that may be used to implement certain functions of an environment control system. In some embodiments, neural network 1800 implements an autonomous environment control algorithm. In some embodiments, neural network 1800 comprises an input layer 1802, a hidden layer 1810, and an output layer 1872.

In some embodiments, input layer 1802 is comprised of a plurality of input nodes, including an input node 1804, an input node 1806, through an input node 1808. Inputs to input nodes include system-wide information including LSOR occupants counts, a time of the day, a day of the week, a calendar date, as well as local weather metrics (e.g., temperature, humidity and cloudiness). To accomplish this, some embodiments of processing system 104 include a time clock and a calendar.

Other inputs to input nodes include variables for each environment controller in an environment. These input variables include, for each environment controller, ambient light level and color point, barometric pressure level, ambient temperature, humidity, surrounding air quality level (IAQ) and current settings of its associated load. The system combines inputs from all environmental controllers in a local distributed database and/or in a centralized cloud database. In most installations there is one environment controller for every controlled load; therefore the number of environment controllers and number of loads are of the same value, "n".

In some embodiments, each node in input layer 1802 is coupled to one or more nodes in hidden layer 1804. As shown in FIG. 18, hidden layer 1804 is comprised of layers of nodes. A first layer of nodes is comprised of a node 1812, a node 1814, a node 1816, a node 1818, a node 1820, a node 1822, a node 1824, through a node 1826, a node 1828, and a node 1830. In some embodiments, each node in input layer 1802 is coupled to each of node 1812 through node 1830 that comprise the first layer in hidden layer 1804.

In some embodiments, hidden layer 1804 includes additional layers of nodes, such as a second layer of nodes that is comprised of a node 1832, a node 1834, a node 1836, a node 1838, a node 1840, a node 1842, a node 1844, through a node 1846, a node 1848, and a node 1850. Each node of the first layer in hidden layer is coupled to each node in the second layer via a coupling 1880. (For ease of presentation, coupling 1880 is used to signify that each of node 1812 through node 1830 is coupled to each of node 1832 through node 1850.) In this way, each node in each layer in hidden layer 1804 is coupled to each node of a subsequent layer.

In some embodiments, hidden layer 1804 includes a final layer that is comprised of a node 1852, a node 1854, a node 1856, a node 1858, a node 1860, a node 1862, a node 1864, through a node 1866, a node 1868, and a node 1870. Each of node 1852 through node 1870 is coupled to each node in an output layer 1872, where output layer 1872 is comprised of a node 1874, a node 1876, through a node 1878. Each of node 1874 through node 1878 outputs a setting for each load in the environment, in accordance with learned and processed occupant preferences. For example, node 1847 may output an ambient light level for a corresponding lighting load, node 1876 may control an HVAC setting, and node 1878 may control a window shade. In this way, neural network 1800 performs all necessary processing functions that enable environment control system 100 to determine a user interaction with the environment, determine a user intent associated with controlling multiple devices associated with the environment, continuously monitor the environment condition, control the devices responsive to determining the user interaction, the user intent and the environment condition.

In some embodiments an algorithm associated with neural network 1800 processes the input feature data through a number of deep hidden layers with various weights that are continually updated throughout the learning process. As a result, these weights are measures of the occupants' habits, allowing the algorithm to output the desired space settings. In another embodiment, the architecture of neural network 1800 could be a recursive neural network (RNN), a convolution neural network (CNN), or a combination of various types of neural networks. The algorithm could also employ reinforcement learning to improve its predictions. Output layer 1872 consists of all connected loads and their settings information which can be described as one value or multiple values depending on the type of the load (e.g., one value for a hardwired incandescent bulb versus multiple values for a wirelessly paired smart color bulb)

Figure 19A:
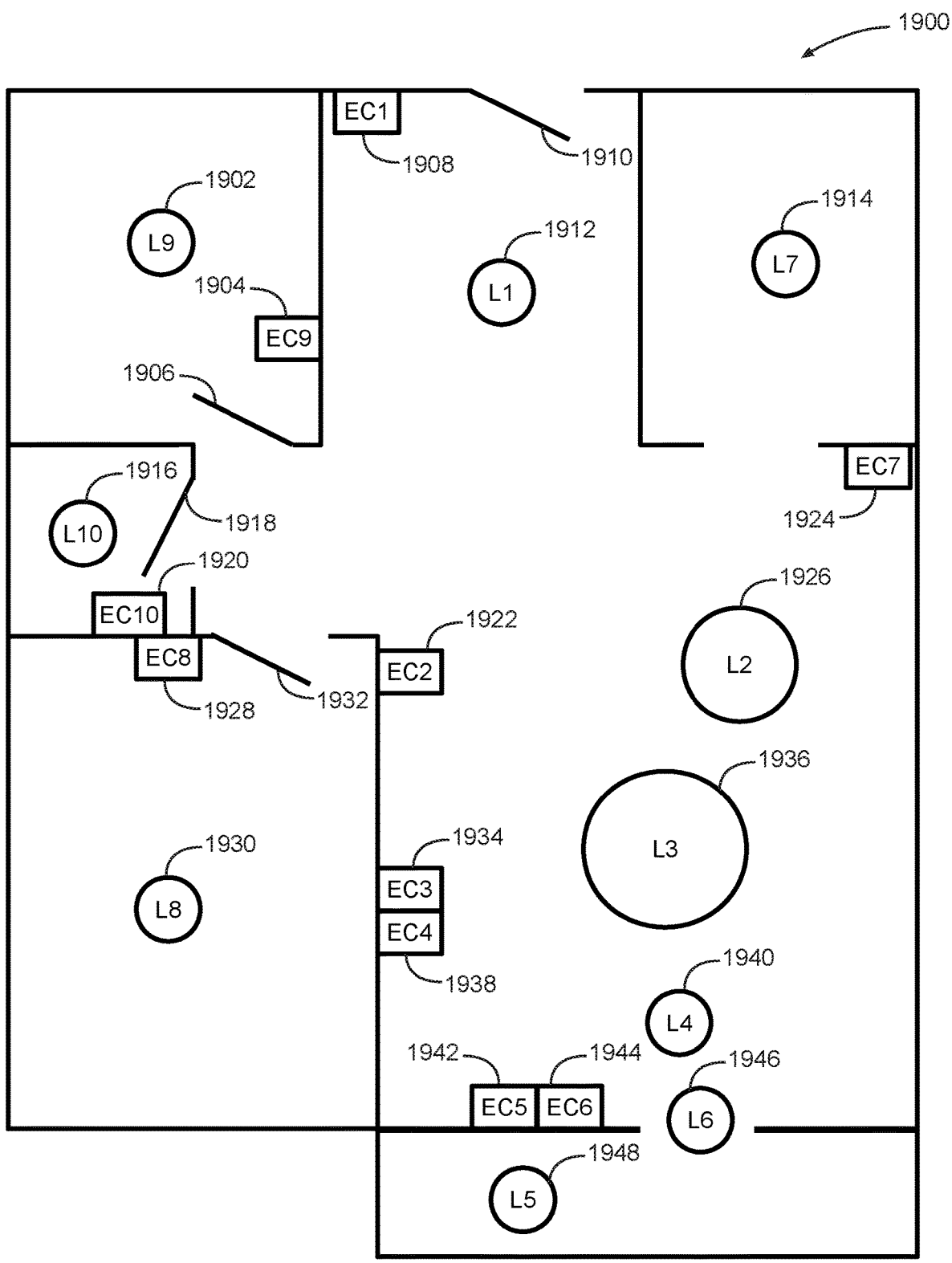
FIG. 19A is a schematic diagram depicting an indoor region with multiple environments.

FIG. 19A is a schematic diagram depicting an indoor region 1900 with multiple environments. As shown in FIG. 19A, indoor region 1900 is an apartment with 10 different load zones—a load zone L1 1912, a load zone L2 1926, a load zone L3 1936, a load zone L4 1940, a load zone L5 1948, a load zone L6 1946, a load zone L7 1914, a load zone L8 1930, a load zone L9 1902, and a load zone L10 1916. Each load zone corresponds to a unique environment in indoor region 1900. In some embodiments, indoor region 1900 includes 10 environment controllers—an environment controller EC1 1908, an environment controller EC2 1922, and environment controller EC3 1934, an environment controller EC4 1938, an environment controller EC5 1942, an environment controller EC6 1944, an environment controller EC7 1924, an environment controller EC8 1928, an environment controller EC9 1904, and an environment controller EC10 1920. There is a one-to-one correspondence between an index of an environment controller and an index of a corresponding load zone covered by that environment controller. For example, environment controller EC1 1908 covers load zone 1 1912, environment controller EC2 1922 covers load zone 2 1922, and so on. Indoor region 1900 is divided into different environments, some environments being associated with rooms. For example, an environment associated with load zone L8 1930 may be a bedroom, or an environment associated with load zone L9 1902 may be a bathroom. Indoor region 1900 also has a door 1910 that serves as a main entrance to indoor region 1900. Indoor region 1900 is also shown to have load zones that are associated with individual rooms that comprise distinct environments. Specifically, load zone L9 1902 is a bathroom that has a door 1906, load zone L10 1619 is a closet that has a door 1918, load zone L8 is a bedroom that has a door 1932, and load zone L7 1914 is a kitchen.

In some embodiments, an initialization process associated with all environment controllers in indoor region 1900 (i.e., environment controller EC1 1908 through environment controller EC10 1920) includes each environmental controller attempting to define LSORs in associated load zones by monitoring occupants' movements and applying the clustering algorithm as mentioned before.

Figure 19B:
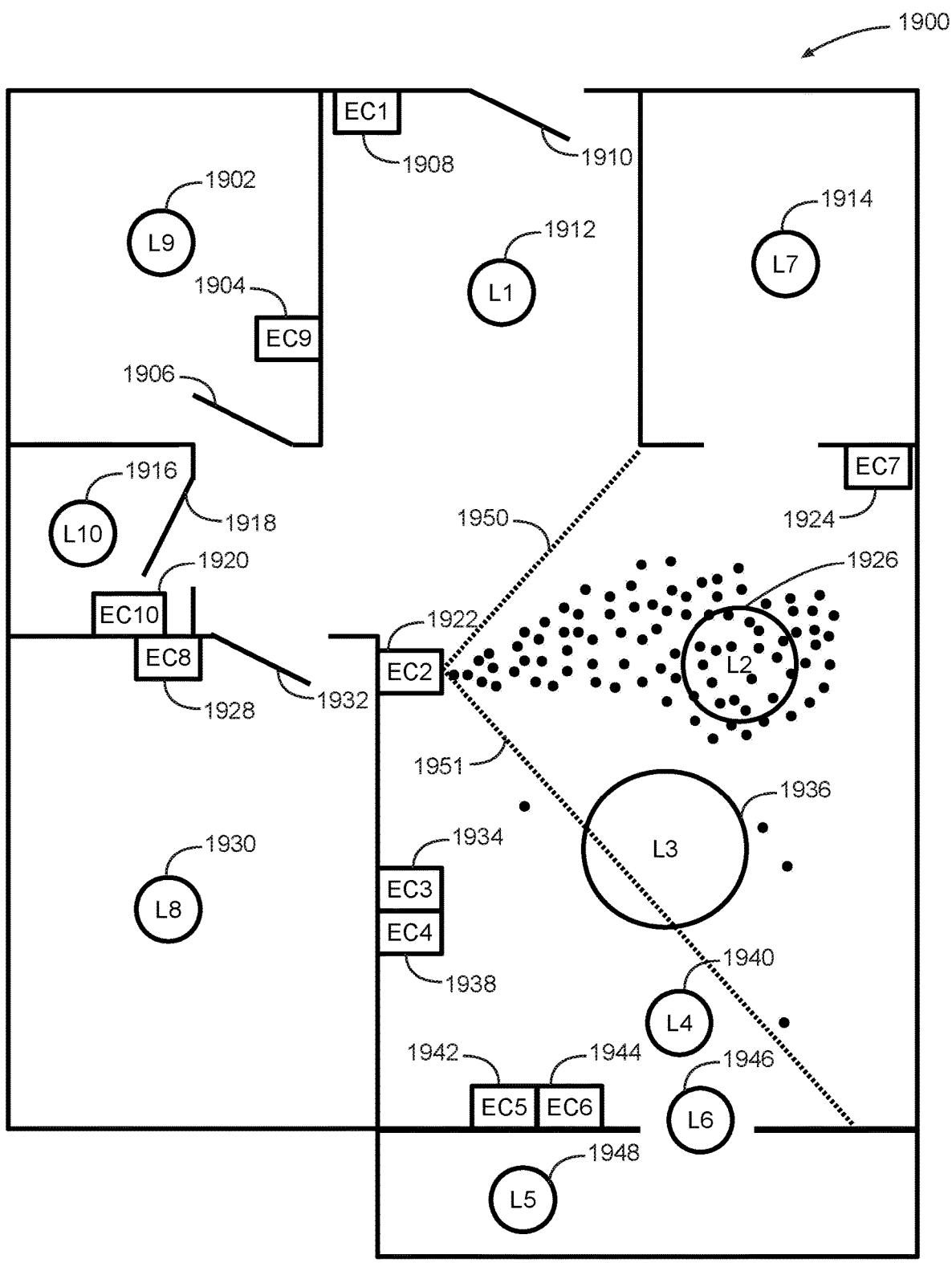
FIG. 19B is a schematic diagram depicting an indoor region with multiple environments and a region of coverage associated with an environment controller.

FIG. 19B is a schematic diagram depicting indoor region 1900 with multiple environments and a region of coverage associated with environment controller EC2 1922. A field of view of environment controller EC2 1922 is delineated by a first boundary 1950 and a second boundary 1951. FIG. 19B shows a coverage zone associated with this field of view. A temporal pattern of an occupant's temporal motion is shown by dots in this field of view. Each of environment controller EC1 1908 through environment controller EC10 1920 has an associated field of view. For clarity, only the field of view of environment controller EC2 1922 is shown in FIG. 19B.

Figure 19C:
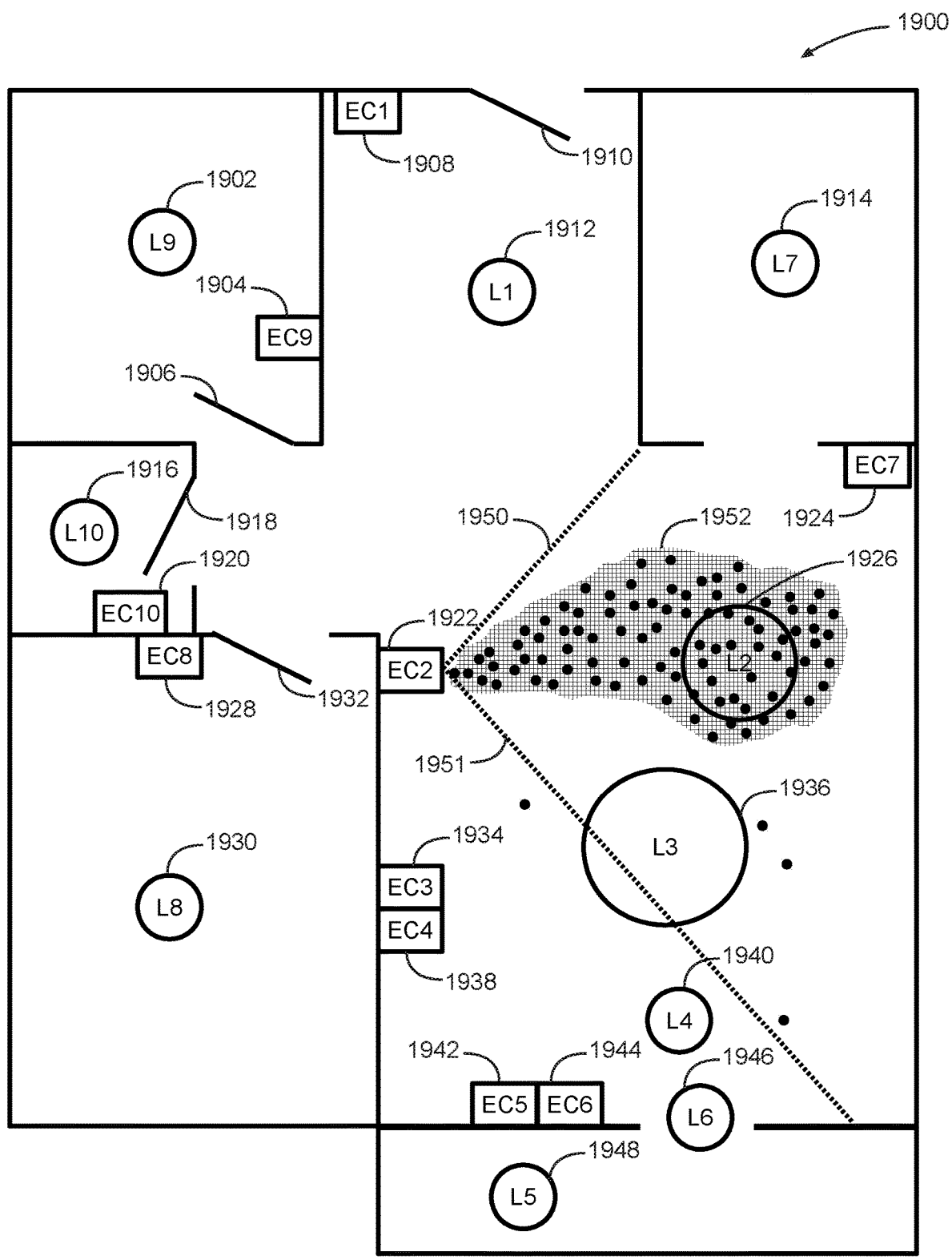
FIG. 19C is a schematic diagram depicting an indoor region with multiple environments and a defined LSOR.

FIG. 19C is a schematic diagram depicting indoor region 1900 with multiple environments and a defined LSOR 1952. In some embodiments, LSOR 1952 is based on an occupancy region associated with load zone L2 1926 as seen and generated by environment controller EC2 1922 running the clustering algorithm described above, and probabilistically calculating an occupancy pattern. Other LSORs can be similarly defined for other loads and environment controllers in indoor region 1900.

Figure 19D:
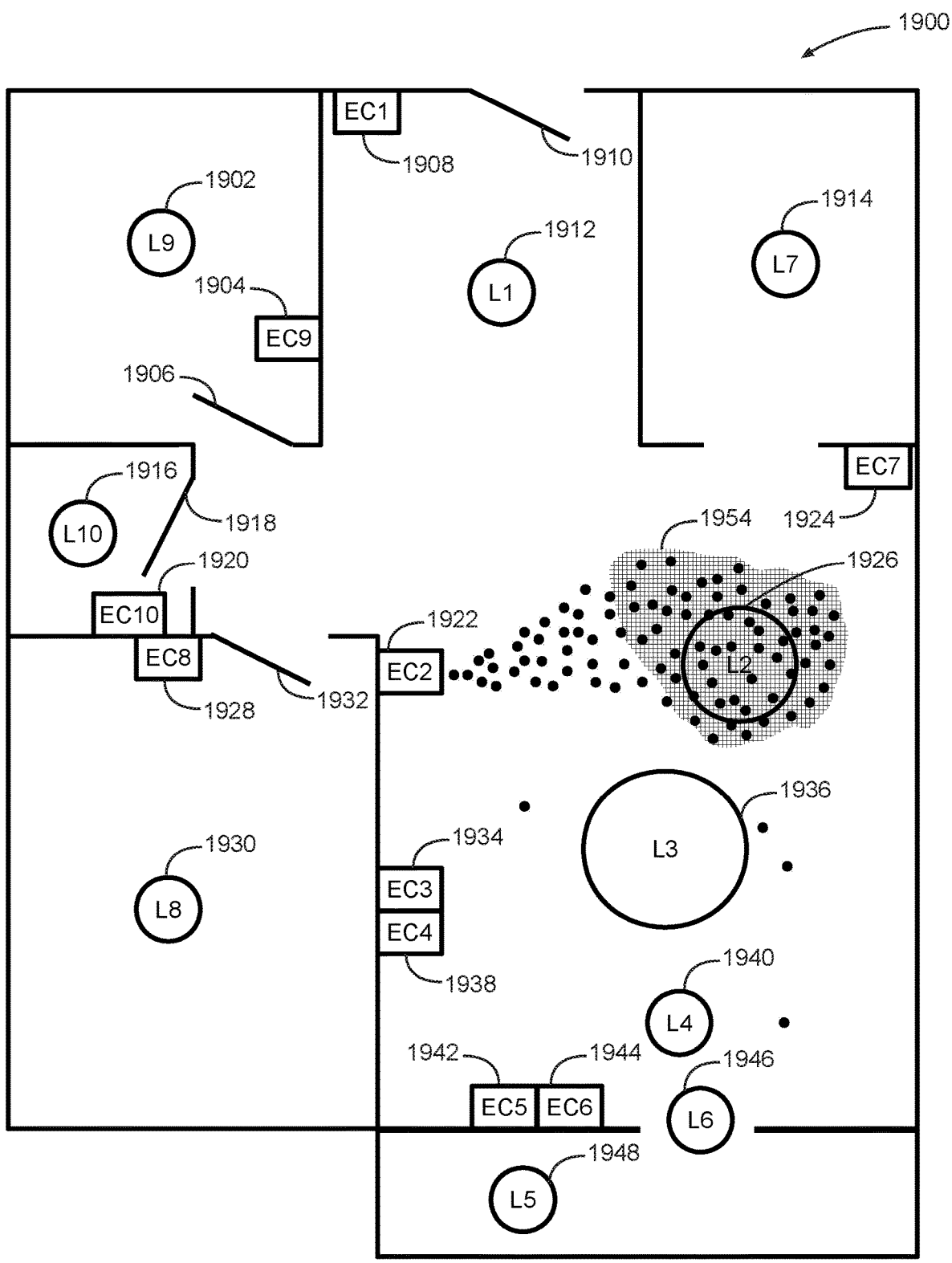
FIG. 19D is a schematic diagram depicting an indoor region with multiple environments and a defined LSOR.

FIG. 19D is a schematic diagram depicting indoor region 1900 with multiple environments and a defined LSOR 1954. In FIG. 19D, LSOR 1954 is based on an LSOR associated with load zone L2 1926 as defined by environment controller EC7 1924. In some embodiments, an LSOR defined by an environmental controller can be defined as being "null," meaning that none of the occupancy information perceived by that environment controller will affect a specific load. An example is an LSOR defined in load zone L8 1930, as seen by environment controller EC2 1922, since chances of having an occupant activating load zone L2 1926 (a dining room load) and occupying the space covered by environment controller EC8 1928 (a bedroom) for a long period of time and before deactivating load zone L2 1926 is very low. As a result, the clustering algorithm defines LSOR defined in load zone L8 1930, as seen by environment controller EC2 1922 as "null." After defining all local regions, all calculated LSOR boundaries data get processed by step 910 and step 912 in FIG. 9, and as a result an "n" system wide LSORs will be defined, where "n" denotes the number of loads.

Figure 19E:
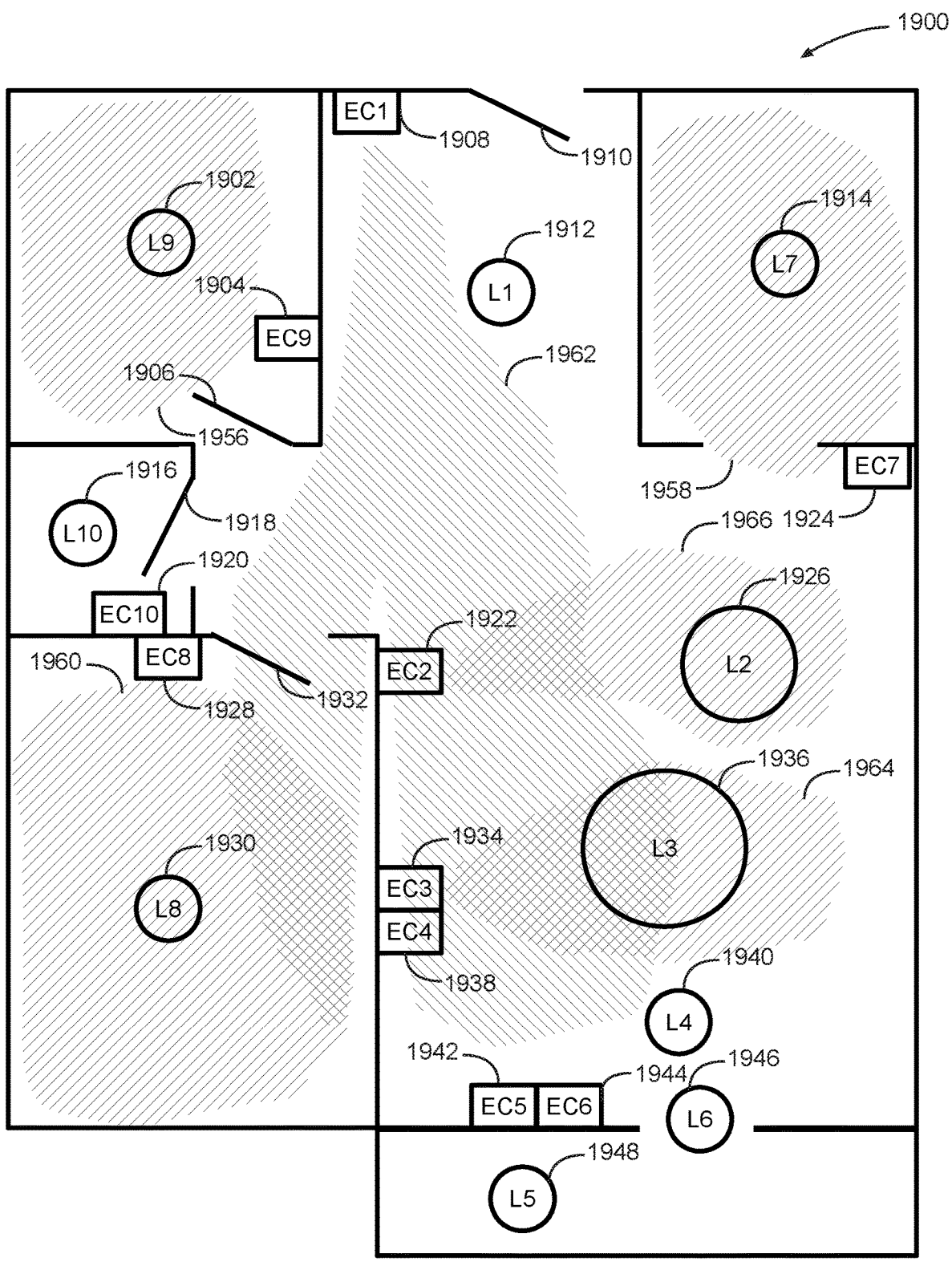
FIG. 19E is a schematic diagram depicting an indoor region with multiple environments and fields of view of multiple environment controllers.

FIG. 19E is a schematic diagram depicting indoor region 1900 with multiple environments and fields of view of multiple environment controllers. FIG. 19E depicts an LSOR 1962 associated with load zone L1 1912, an LSOR 1966 associated with load zone L2 1926, an LSOR 1964 associated with load zone L3 1936, an LSOR 1958 associated with load zone L7 1914, an LSOR 1956 associated with load zone L9 1902, and an LSOR 1960 associated with load zone L8 1930. In FIG. 19E, LSORs are depicted typical occupancy patterns in indoor region 1900. After the system defines the LSORs, it starts to monitor occupants' habits and their usual settings for the space. In this example, a typical routine for the user could be their "arriving back home" routine. Let's say the user enters the apartment at 5:12 pm on a Tuesday. They first occupy LSOR 1962 and turn on a light associated with load zone 1912 L1 light to 100% by interacting with environment controller EC1 1908 in a "manual mode." As part of their typical routine, they might then head to the living room, occupying LSOR 1964. The occupant activates one or more devices associated with load zone L3 1936 to 50%, one or more devices associated with load zone L4 1940 to 70%, and one or more devices associated with load zone L6 1946 half way (50%). In some embodiments, these devices could be any combination of lights, window shades, and HVAC controls. In this case, the training records will contain all sensor information associated with each environment controller (ambient light, LSOR counts, etc.), as well as the system-wide info (time of the day, day of the week, etc.). The algorithm will also record the new output layer data as load zone L1 1912 at 100%, load zone L3 1936 at 50%, load zone L4 1940 at 70%, load zone L6 1946 at 50%, and all other load zones at 0%. This recorded data is stored along with data associated with a previous output layer. The user might repeat a similar routine every weekday around the same time. After logging enough training records and capturing these routine interaction habits, the autonomous control algorithm's weights will be configured in such a way that allows full autonomous control the next time the user comes back home. This is because when the user returns home around their usual time on a weekday, the system detects a transition associated with an LSOR 1962 count which, in turn, triggers the autonomous control algorithm. In this instance, the algorithm is presented with input features that are very similar to what it captured the past few times the user entered home around this time on a weekday. As a result, the output of the algorithm has a very high chance of matching the user's usual space settings or being very close to it and setting load zone L1 1912 at ~100%. Similarly, when the user heads to the living room and occupies LSOR 1964, the system detects a transition associated with account associated with LSOR 1964 which, in turn, triggers the autonomous control algorithm. As a result, the output of the algorithm has a very high chance of matching the user's usual space settings or being very close to it and setting load zone L3 1936 at ~50%, load zone L4 1940 at ~70%, and load zone L6 1946 at ~50%.

In some embodiments, the system continues to monitor the conditions and user behavior associated with indoor region 1900 to make any needed adjustments. For example, suppose the living room is brighter than usual when the occupants arrive back home in the summertime. Due to this, the customer might adjust a window shade associated with load zone L6 1946 to close completely by accessing environment controller EC6 1944. The system logs this adjustment (50% reduced to 0%) and after few records, it allows it to recognize the relationship between the ambient light level measured in the living room and the position of this window shade. As a result, the space will continue to be autonomously controlled in such a way that the total ambient light level matches the desired user settings, regardless of the season or weather.

Other embodiments of environment control system 100 include an ability to interface with a computing device such as a mobile phone, a tablet, a wearable device, a laptop computer, a desktop computer, or a remote server using a communication method such as WiFi, Bluetooth, cellular and so on. In some embodiments, the computing device may be used by a user to remotely control environment control system 100 via a software application running on the computing device. In other embodiments, environment control system 100 may be configured to modify an operating characteristic of the computing device, such as playing music on the computing device in accordance with a user preference or using Bluetooth beaconing to communicate to the computing device its whereabouts in the environment. This level of awareness can be very valuable to offer new experiences to the user such as to find the whereabouts of a lost smart device or have the smart device adjust its behavior based on its location like silencing the ringer in the bedroom and making it loud in the kitchen.

Another application of environment control system 100 is room-fencing. Environment control system can be used to set up a virtual fence around an individual room inside, for example, a residence. A user then receives an alert from environment control system 100 if the room gets occupied. For example, if a room is determined to be out of bounds for a guest or a dog walker, this feature may be used to implement a virtual fence around the room.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An environment control system comprising:
    a sensing system configured to generate geometric positional vector data associated with motion of one or more users in an environment, wherein the geometric positional vector data includes one or more user locations within the environment;
    a user interface configured to receive one or more user inputs from an activating user to alter one or more parameters associated with the environment; and
    a processing system configured to:
        receive the geometric positional vector data from the sensing system and the user inputs from the user interface;
        detect a presence of the activating user in the environment based on the geometric positional vector data;
        log a temporal history associated with the geometric positional vector data,
        wherein the logging is triggered by the activating user interacting with the user interface, and wherein the log includes one or more user locations in the environment subsequent to the activating user inputting the user inputs into the user interface;
        learn one or more user preferences based on the user inputs;
        define a region in the environment based on the log; and
        automatically adjust the one or more parameters based on the learning and additional geometric positional vector data generated by a post-learning motion of the user within the region.

2. The environment control system of claim 1, wherein the sensing system includes a radar sensor.

3. The environment control system of claim 1, wherein a combination of the sensing system and the processing system are enclosed in a lighting controller or a heating, ventilation and air conditioning (HVAC) controller.

4. The environment control system of claim 1, wherein the one or more parameters associated with the environment are altered by the processing system via devices including at least one of a light, an HVAC system, a fan, a window shade, a music player, an alarm, a siren, or any combination thereof.

5. The environment control system of claim 1, wherein the region is used as a basis to generate a map of the environment.

6. The environment control system of claim 1, wherein the processing system automatically characterizes the environment based on the parameters.

7. The environment control system of claim 6, wherein the environment is characterized as any of a living room, a kitchen, a bathroom, or a bedroom.

8. An environment control system comprising:
    a sensing system configured to:
        sense one or more environmental parameters associated with the environment, including one or more changes in the environmental parameters resulting from at least one user interaction with the environment by one or more users present in the environment;
        generate sensing data based on the sensing, wherein the sensing data includes data associated with the changes;
        generate geometric positional vector data associated with motion of the one or more users in the environment, wherein the geometric positional vector data includes one or more user locations within the environment; and a processing system configured to:
receive the sensing data from the sensing system;
log a temporal history associated with the sensing data;
receive the geometric positional vector data from the sensing system;
log a temporal history associated with the geometric positional vector data including one or more user locations associated with motion of the one or more users in the environment, wherein the logging the temporal history associated with the geometric positional vector data is triggered by the processing system detecting the changes within the sensing data;
define a region of the environment based on the log;
learn an association between a user presence in the environment and the changes in the environmental parameters; and
automatically adjust the one or more parameters based on the learning and additional geometric positional vector data generated by a post-learning motion of the users within the region.

9. The environment control system of claim 8, wherein the sensing system includes a radar sensor, a humidity sensor, an ambient light sensor, a temperature sensor, an air quality sensor, a gyroscope, an accelerometer, a microphone, a smoke detector, a power monitor, an infrared sensor, an ultrasonic sensor, a camera, a magnetometer, or any combination thereof.

10. The environment control system of claim 8, wherein the one or more parameters associated with the environment are altered by the processing system via devices including at least one of a light, an HVAC system, a fan, a window shade, a music player, an alarm, a siren, or any combination thereof.

11. The environment control system of claim 8, wherein a combination of the sensing system and the processing system are enclosed in a lighting controller or an HVAC controller.

12. The environment control system of claim 8, wherein the processing system automatically characterizes the environment based on the parameters.

13. A method comprising:
generating, by a sensing system, geometric positional vector data associated with motion of one or more users in an environment, wherein the geometric positional vector data includes one or more user locations within the environment;
receiving, by a user interface, one or more user inputs from an activating user to alter one or more parameters associated with the environment;
receiving, by a processing system, the geometric positional vector data from the sensing system;
receiving, by the processing system, the user inputs from the user interface;
detecting, by the processing system, a presence of the activating user in the environment based on the geometric positional vector data;
logging, by the processing system, a temporal history associated with the geometric positional vector data, wherein the logging is triggered by the activating user interacting with the user interface, and wherein the log includes one or more user locations in the environment subsequent to the activating user interacting with the user interface;
learning, by the processing system, one or more user preferences based on the user inputs;
defining, by the processing system, a region in the environment based on the log; and
automatically adjusting, by the processing system, the one or more parameters based on the learning and additional geometric positional vector data generated by a post-learning motion of the user within the region.

14. The method of claim 13, wherein the sensing system includes a radar sensor.

15. The method of claim 13, wherein a combination of the sensing system and the processing system are enclosed in a lighting controller or an HVAC controller.

16. The method of claim 13, wherein the one or more parameters associated with the environment are altered by the processing system via devices including at least one of a light, an HVAC system, a fan, a window shade, a music player, an alarm, a siren, or any combination thereof.

17. The method of claim 13, further comprising generating, by the processing system, a map of the environment based on the region.

18. The method of claim 13, further comprising characterizing, by the processing system, the environment based on the parameters.

19. The method of claim 18, wherein the environment is characterized as any of a living room, a kitchen, a bathroom, or a bedroom.

20. A method comprising:
sensing, by a sensing system, one or more environmental parameters associated with an environment, including one or more changes in the environmental parameters resulting from at least one user interaction with the environment by one or more users present in the environment;
generating, by the sensing system, sensing data based on the sensing, wherein the sensing data includes data associated with the changes;
generating, by the sensing system, geometric positional vector data associated with motion of one or more users in the environment, wherein the geometric positional vector data includes one or more user locations within the environment;
receiving, by a processing system, the sensing data from the sensing system;
logging, by the processing system, the sensing data;
receiving, by the processing system, the geometric positional vector data, from the sensing system;
logging, by the processing system, the geometric positional vector data including one or more user locations associated with motion of the one or more users in the environment, wherein the logging the temporal history associated with the geometric positional vector data is triggered by the processing system detecting the changes within the sensing data; and
defining, by the processing system, a region of the environment based on the log;
learning, by the processing system, an association between a user presence in the environment and the changes in the environmental parameters; and
automatically adjusting, by the processing system, the one or more parameters based on the learning and additional geometric positional vector data generated by a post-learning motion of the users within the region.

21. The method of claim 20, wherein the sensing system includes a radar sensor, a humidity sensor, an ambient light sensor, a temperature sensor, an air quality sensor, a gyroscope, an accelerometer, a microphone, a smoke detector, a power monitor, an infrared sensor, an ultrasonic sensor, a camera, a magnetometer, or any combination thereof.

22. The method of claim 20, wherein the one or more parameters associated with the environment are altered by the processing system via devices including at least one of a light, an HVAC system, a fan, a window shade, a music player, an alarm, a siren, or any combination thereof.

23. The method of claim 20, wherein a combination of the sensing system and the processing system are enclosed in a lighting controller or an HVAC controller.

24. The method of claim 20, further comprising automatically characterizing, by the processing system, the environment based on the parameters.

* * * * *